(12) United States Patent
Lasseter et al.

(10) Patent No.: US 7,932,637 B2
(45) Date of Patent: Apr. 26, 2011

(54) CONTROL OF SMALL DISTRIBUTED ENERGY RESOURCES

(75) Inventors: Robert H. Lasseter, Madison, WI (US); Paolo Piagi, Woburn, MA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 12/704,060

(22) Filed: Feb. 11, 2010

(65) Prior Publication Data
US 2010/0207456 A1 Aug. 19, 2010

Related U.S. Application Data

(63) Continuation of application No. 11/084,737, filed on Mar. 18, 2005, now Pat. No. 7,687,937.

(51) Int. Cl.
*H02J 3/38* (2006.01)
(52) U.S. Cl. ............................... 307/69; 307/19; 307/65
(58) Field of Classification Search .................... 307/19, 307/65, 69
See application file for complete search history.

(56) References Cited

U.S. PATENT DOCUMENTS

| | | | |
|---|---|---|---|
| 5,041,959 A | 8/1991 | Walker | |
| 5,329,222 A | 7/1994 | Gyugyi et al. | |
| 5,596,492 A | 1/1997 | Divan et al. | |
| 5,614,770 A | 3/1997 | Suelzle | |
| 5,745,356 A | 4/1998 | Tassitino, Jr. et al. | |
| 6,111,764 A | 8/2000 | Atou et al. | |
| 6,188,205 B1 | 2/2001 | Tanimoto et al. | |
| 6,219,591 B1 | 4/2001 | Vu et al. | |
| 6,219,623 B1 | 4/2001 | Wills | |
| 6,249,411 B1 | 6/2001 | Hemena et al. | |
| 6,252,310 B1 | 6/2001 | Wilhelm | |
| 6,285,917 B1 | 9/2001 | Sekiguchi et al. | |
| 6,288,456 B1 | 9/2001 | Cratty | |
| 6,347,027 B1 | 2/2002 | Nelson et al. | |
| 6,356,471 B1 | 3/2002 | Fang | |

(Continued)

FOREIGN PATENT DOCUMENTS

CA 2497567 4/2004

(Continued)

OTHER PUBLICATIONS

"1547 IEEE Standard for Interconnecting Distributed Resources with Electric Power Systems," Institute of Electrical and Electronics Engineers, Standards Coordinating Committee 21, Jul. 28, 2003. (HTTp?//IEEEXPLORE,IEEE.ORG/IE15/8676/27496/01225051. pdf?isnumber=27496&prod=STD&arnumber=1225051&arST=+0 1&ared=+16&arAuthor=,visited Jan. 14, 2008.

(Continued)

*Primary Examiner* — Hal I Kaplan
(74) *Attorney, Agent, or Firm* — Bell & Manning, LLC

(57) ABSTRACT

A method includes operating a microsource in a grid mode in which the microsource is connected to a utility grid. The microsource is located in a microgrid and is configured to deliver a power $P_1$ at a frequency $\omega_1$. During operation in the grid mode $\omega 1$ is a first frequency and $P_1$ is a first power. The first frequency is an operating frequency of the utility grid. The microsource is transferred from the grid mode to an island mode, causing a frequency change such that $\omega_1$ changes to a second frequency and a power change such that $P_1$ changes to a second power. The frequency change occurs at a first rate with respect to the power change while $\omega 1$ is less than a slope switch frequency. The frequency change occurs at a second rate with respect to the power change while $\omega_1$ is greater than the slope switch frequency.

20 Claims, 25 Drawing Sheets

U.S. PATENT DOCUMENTS

| | | | |
|---|---|---|---|
| 6,359,423 | B1 | 3/2002 | Noro |
| 6,465,910 | B2 | 10/2002 | Young et al. |
| 6,738,692 | B2 | 5/2004 | Schienbein et al. |
| 6,870,279 | B2 | 3/2005 | Gilbreth et al. |
| 7,116,010 | B2 | 10/2006 | Lasseter et al. |

FOREIGN PATENT DOCUMENTS

| | | |
|---|---|---|
| EP | 1540791 | 4/2004 |
| WO | WO 2004/027957 | 4/2004 |

OTHER PUBLICATIONS

Doe News, the DER Weekly, vol. 2, No. 10, Mar. 9, 2001, pp. 1-4.
Friedman, N. R., "Distributed Energy Resources Interconnection Systems: Technology Review and Research Needs," *National Renewable Energy Laboratory*, Sep. 2002.
Lasseter, B. et al., "Reliability, DER & Micro Grids," *EPRI's Sixth Annual Distributed Resources Conference*, Oct. 5, 2000.
Lasseter, B., "MicroGrid Concept," *IEEE Winter Meeting*, Jan. 31, 2001.
Lasseter, B., "Dynamic Models for Micro-Turbines and Fuel Cells," Panel on Modeling New Forms of Generation & Storage for Stability Analysis, *CERTS*, Jul. 17, 2001.
Lasseter, R. H., "Micro Grids and Distributed Resources," Oct. 1999.
Lasseter, R. H., "Integration of Distributed Energy Resources—Micro Grids," *CERTS*, Mar. 2000.
Lasseter, R. H., "Integration of Distributed Energy Resources—Scenarios & Models," *CERTS*, Apr. 2000.
Lasseter, R. H. et al., "Scenarios for Distributed Technology Applications with Steady State and Dynamic Models of Load and Micro-Sources," *Consortium for Electric Reliability Technology Solutions*, Apr. 14, 2000.
Lasseter, R. H., "Distributed Energy Resources & Micro Grids," *T&D Committee*, Jul. 20, 2000.
Lasseter, R. H., "Distributed Energy Resources & Power Electronics," *DOE/ORNL*, Oct. 26, 2000.
Lasseter, R. H. et al., "Analysis of Distributed Generation Systems," *IAB Meeting*, Denver, Colorado, Fall 2000.
Lasseter, R. H., "Micro-Grid Operation and Control," HICSS-34, Lecture 14, Jan. 3-6, 2001.
Lasseter, R. H., "Operation and Control of Micro-Grids," HICSS-34, Lecture 14, Jan. 3-6, 2001.
Lasseter, R. H., "MicroGrid Proof of Concept," *Consortium for Electric Reliability Technology Solutions*, Jun. 2001.
Lasseter, R. H. et al., "Integration of Distributed Energy Resources The CERTS MicroGrid Concept," *Consortium for Electric Reliability Technology Solutions*, Apr. 2002, pp. 1-27.
Lasseter, R. H., "MicroGrids," *IEEE*, No. 0-7803-7322, Jul. 2002, pp. 305-308.
Advisory Action for U.S. Appl. No. 11/266,976 mailed Oct. 16, 2008.
Final Office Action for U.S. Appl. No. 10/245,729 mailed Jan. 12, 2006.
Final Office Action for U.S. Appl. No. 11/084,737 mailed Dec. 14, 2007.
Final Office Action for U.S. Appl. No. 11/266,976 mailed Aug. 4, 2008.
Final Office Action for U.S. Appl. No. 11/084,737 mailed Aug. 28, 2008.
International Search Report for PCT/US2003/018916 mailed Sep. 8, 2003.
Notice of Allowance for U.S. Appl. No. 11/266,976 mailed Nov. 14, 2008.
Supplementary European Search Report for EP 03742007.2 mailed Aug. 26, 2009.

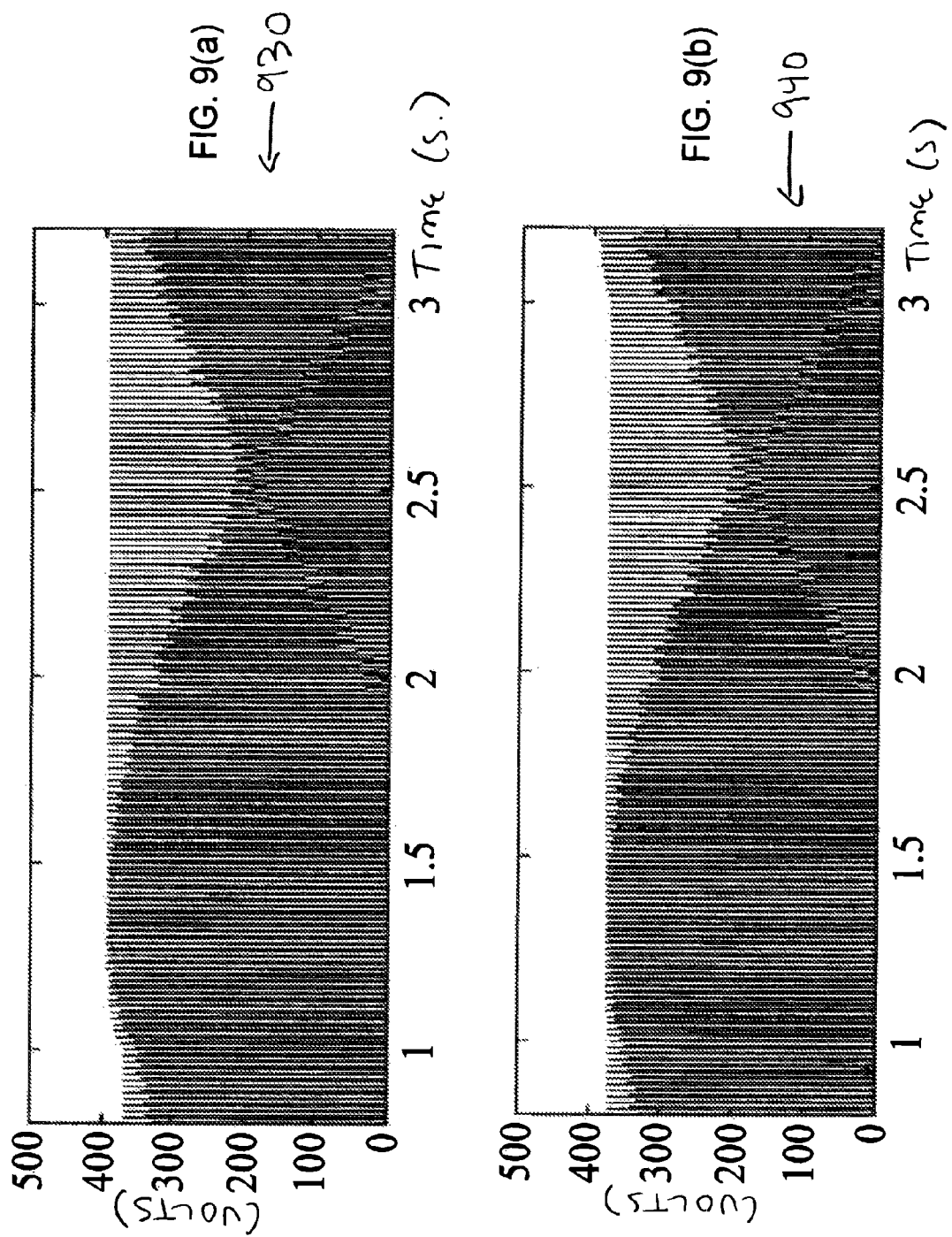

CONTROL OF SMALL DISTRIBUTED ENERGY RESOURCES

CROSS-REFERENCE TO RELATED PATENT APPLICATIONS

This application is a continuation application of U.S. patent application Ser. No. 11/084,737 filed Mar. 18, 2005, the disclosure of which is incorporated herein by reference in its entirety.

REFERENCE TO GOVERNMENT RIGHTS

This invention was made with United States government support awarded by the following agencies:
DOE DE-ACO3-765F00098
NSF 0119230
The United States has certain rights in this invention.

FIELD

The present invention relates generally to power systems and methods, including distributed energy resources (DER) systems and methods, and more particularly to devices and methods for controlling small distributed energy resources and/or associated loads.

BACKGROUND

In the United States and around the world, the demand for electrical power continues to grow. At the same time, aging transmission and distribution systems remain subject to occasional failures. Massive failures covering wide geographical areas and affecting millions of people have occurred, even in the United States which has historically enjoyed a relatively robust electrical power system. These problems with the capacity and reliability of the public power grid have driven the development of distributed energy resources (DER), small independent power generation and storage systems which may be owned by, and located near, consumers of electrical power.

One motivating factor is that distributed energy resources can provide more reliable power in critical applications, as a backup to the primary electrical supply. For example, an interruption of power to a hospital can have life-threatening consequences. Similarly, when power to a factory is interrupted, the resulting losses, for example in productivity, wasted material in process that must be scrapped, and other costs to restart a production line, can be catastrophic. In situations like these, where the loss of electrical power can have serious consequences, the cost of implementing a distributed energy resource as a backup can be justified.

Reliability is not the only factor driving the development of distributed energy resources. Power from a distributed energy resource can, in some cases, be sold back to the main power grid. Geographically distributed sources of power, such as wind, solar, or hydroelectric power, may be too limited or intermittent to be used as the basis for a centralized power plant. By harnessing these types of geographically distributed sources using multiple distributed energy resources, these types of power sources can supplement or replace conventional power sources, such as fossil fuels, when the main power grid is available, and provide backup to their owners when the main power grid is unavailable.

In this context, distributed energy resources (DER) have emerged as a promising option to meet customers current and future demands for increasingly more reliable electric power.

Power sources for DER systems, sometimes called "microsources," range in size and capacity from a few kilowatts up to 10 MW, they may include a variety of technologies, both supply-side and demand-side, and they are typically located where the energy is used.

Generally speaking, distributed energy resources can harness two broad categories of electrical power sources: DC sources, such as fuel cells, photovoltaic cells, and battery storage; and high-frequency AC sources, such as microturbines and wind turbines. Both types of sources are typically used to provide an intermediate DC voltage, that may be produced directly by DC sources, and produced indirectly from AC sources, for example by rectification. In both types of sources, the intermediate DC voltage is subsequently converted to AC voltage or current at the required frequency, magnitude, and phase angle for use. In most cases, the conversion from the intermediate DC voltage to the usable AC voltage is performed by a voltage inverter that can rapidly control the magnitude and phase of its output voltage.

Distributed energy resources are usually designed to operate in one of two modes: (1) "isolation" or "island" mode, isolated from the main grid, and (2) normal "grid" mode, connected to the main grid. For large utility generators, methods have been developed to allow conventional synchronous generators to join and to separate from the main electrical power grid smoothly and efficiently when needed. Because of fundamental differences between distributed energy resources, such as inverter based microsources or small synchronous generators, and centralized energy resources, these existing methods are not suitable to allow distributed energy resources to smoothly and efficiently transition between island mode and grid mode as the distributed energy resources join and separate from the main power grid.

For example, the fundamental frequency in an inverter is typically derived from an internal clock that does not change as the system is loaded. This arrangement is very different from that of synchronous generators typically used in centralized power systems, in which the inertia from spinning mass determines and maintains system frequency. Inverter-based microsources, by contrast, are effectively inertia-less, so alternative methods must be used to maintain system frequency in an inverter-based microsource.

Another difference between distributed energy resources and centralized energy resources relates to communication and coordination. A centralized electrical power utility is in a position to monitor and coordinate the production and distribution of power from multiple generators. In contrast, distributed energy resources may include independent producers of power who have limited awareness or communication with each other. Even if the independent producers of power are able to communicate with each other, there may not be any effective way to ensure that they cooperate.

Thus, there is a need for methods of controlling microsources in distributed energy resources to ensure that these resources can connect to or isolate from the utility grid in a rapid and seamless fashion, that reactive and active power can be independently controlled, and that voltage sag and system imbalances can be corrected. Further, there is a need for control of the microsources, and in particular the inverters used to supply power to the grid, based solely on information available locally at the inverter so that no communication or coordination between microsources is necessary. Yet further, there is a need for a local controller at the microsource to enable "plug and play" operation of the microsource. In other words, there is a need to add microsources to a distributed energy resource system without changes to the control and protection of units that are already part of the system.

SUMMARY

An exemplary embodiment of the invention relates to a method of controlling the output inverter of a microsource in a distributed energy resource system, using a unit power controller that reduces the operating frequency of the inverter to increase its unit output power. In a preferred embodiment of the invention, the inverter reaches maximum output power and minimum operating frequency at the same time, and it includes a voltage controller implementing a voltage vs. reactive current droop. Other aspects of this embodiment relate to an inverter that implements such methods, and a microsource containing such an inverter. These methods can be extended to control inverters in a plurality of microsources, where the rate of change of frequency vs. power for each microsource depends on its power set point.

Another embodiment of the invention relates to a method of controlling the output inverter of a microsource in a distributed energy resource system, using a unit power controller that reduces the operating frequency of the inverter to increase its unit output power, with the rate of change of frequency vs. power having at least two different values over the operating range of the inverter. In a preferred embodiment of this method, the inverter reaches maximum output power and minimum operating frequency at the same time, and includes a voltage controller that implements a voltage vs. reactive current droop. In some embodiments, the rate of change of power vs. frequency may be zero when the inverter reaches its minimum or maximum power limits, and the rate of change of frequency vs. power may be zero when the inverter reaches its frequency limits. Other aspects of this embodiment relate to an inverter that implements such methods, and a microsource containing such an inverter. This embodiment also can be extended to control inverters in a plurality of microsources, where the rate of change of frequency vs. power for each microsource depends on its power set point.

Another embodiment of the invention relates to a method of controlling the output inverters of a plurality of microsources in a distributed energy resource system, each using a unit power controller that reduces the operating frequency of the inverter to increase its unit output power, with the rate of change of frequency vs. power being the same for each microsource over the operating range of its inverter. In preferred embodiments of this method, each inverter uses a voltage controller that includes a voltage vs. reactive current droop. In some embodiments, the rate of change of power vs. frequency may be zero when the inverter reaches its minimum or maximum power limits, and the rate of change of frequency vs. power may be zero when the inverter reaches its frequency limits. Other aspects of this embodiment relate to an inverter that implements such methods, and a microsource containing such an inverter.

Another embodiment of the invention relates to a method of controlling the output inverter of a microsource in a distributed energy resource system, using a zone power controller that reduces the operating frequency of the inverter to reduce its zone power flow. In a preferred embodiment of the invention, the inverter includes a voltage controller implementing a voltage vs. reactive current droop. Other aspects of this embodiment relate to an inverter that implements such methods, and a microsource containing such an inverter. These methods can be extended to control inverters in a plurality of microsources, where the microsources may be arranged in one or more zones.

Other principal features and advantages of the invention will become apparent to those skilled in the art upon review of the following drawings, the detailed description, and the appended claims.

BRIEF DESCRIPTION OF THE DRAWINGS

FIGS. 9(a) and 9(b) are graphs of predicted regulated voltage on bus 738 and bus 739, respectively, in the exemplary industrial plant of FIG. 7, obtained using a computer simulation of the circuit of FIG. 7 as the exemplary microsources of FIG. 7 are brought online in grid-connected mode;

DETAILED DESCRIPTION

Figure 1:
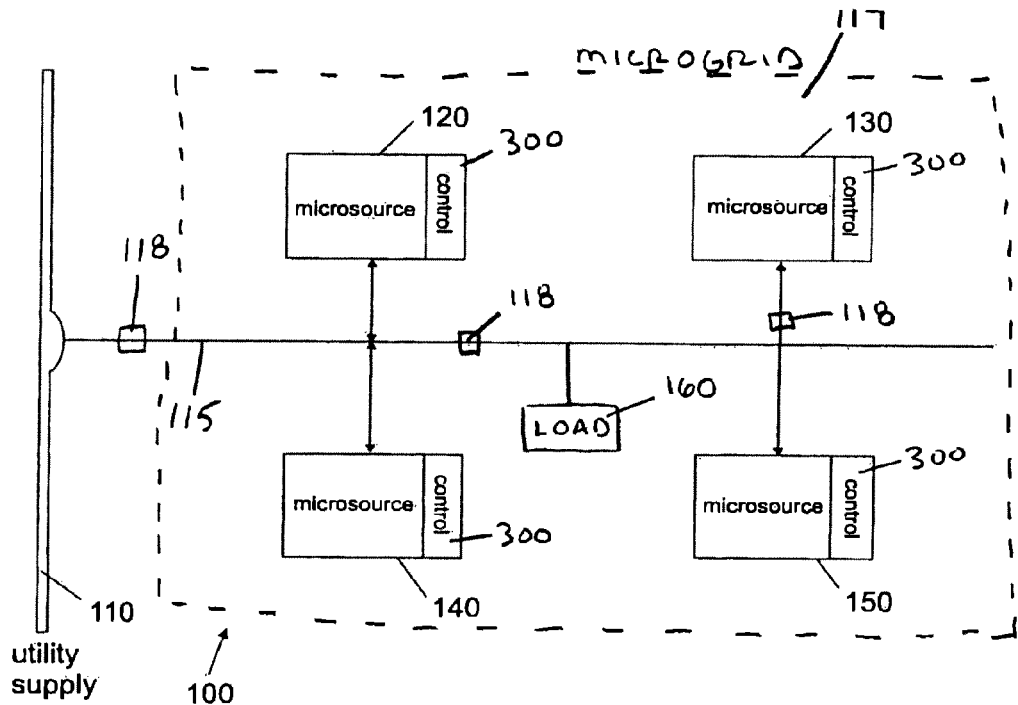
FIG. 1 is a diagram of an exemplary distributed energy resource system.

Referring to the figures, FIG. 1 is a diagram of an exemplary distributed energy resource system. Such an exemplary system is described, for example, in U.S. Patent Application Publication No. US 2004/0051387, the contents of which are incorporated by reference. In the event of any conflict between the disclosure of the present application and the disclosure of U.S. Patent Application Publication No. US 2004/0051387, the disclosure of the present application controls.

The present invention relates to a system for and method of control of small distributed energy resources. This control can be implemented by changing the phase of the output from the microsource as a function of time, to vary the instantaneous frequency and power of that output.

The invention relates more particularly to novel control schemes for controlling the instantaneous frequency and power from one or more microsources in ways that tend to ensure that the microsources stay within their normal operating ranges and otherwise operate effectively. The novel control schemes focus on what needs to be done in response to events such as islanding or new loads to transition smoothly between stable steady state frequency and power operating points.

The scope of the invention is not limited to any particular hardware circuitry that can be used to implement the control schemes of the present invention. A variety of hardware circuitry can be used to implement the control schemes of the present invention. In some embodiments, hardwired circuitry may be used in place of, or in combination with, software instructions to implement the functions described. Thus, the embodiments described herein are not limited to any specific combination of hardware circuitry and software, nor to any particular source for the instructions executed by a computerized control system.

In the following description, for purposes of explanation, numerous specific details are set forth to provide a thorough understanding of exemplary embodiments of the invention. It will be evident, however, to one skilled in the art that the invention may be practiced without these specific details. In other instances, structures and devices are shown in block diagram form to facilitate description of the exemplary embodiments.

The exemplary control schemes of the present invention are directed to ensuring that: (1) new generators can be added to the system without modification of existing equipment; (2) a collection of sources and loads can connect to or isolate from the utility grid in a rapid and seamless fashion; (3) each inverter can respond effectively to load changes without requiring data from other sources; and (4) voltage sag and system imbalances can be corrected.

The system and method for control of small distributed energy resources can be implemented in a wide variety of different ways. Various embodiments may include, for example, DC sources or AC sources. The invention is not limited to a particular embodiment, but extends to various modifications, combinations, and permutations within the scope of the appended claims.

FIG. 1 is a diagram of an exemplary distributed energy resource system 100 including a utility supply 110 connected to one or more feeder lines 115 that interconnect microsource systems 120, 130, 140, and 150 and one or more loads 160. Each microsource system 120, 130, 140, and 150 preferably includes a microsource controller 300. The feeder line 115, the interconnected microsource systems 120, 130, 140, and 150, and the one or more loads 160 can form a microgrid 117. In a distributed energy resource (DER) system, the utility supply 110 can connect the microgrid 117 to other similar microgrids distributed throughout the DER system.

The microsource systems 120, 130, 140, and 150 can include exemplary microsource power sources, power storage, and power controllers. The power source can be, for example, a fuel cell, hydroelectric generator, photovoltaic array, windmill, or microturbine. The power storage, if present, can be, for example, a battery or flywheel. The controller can, for example, control an inverter that determines the flow of power out of the microsource.

The feeder line 115 may include one or more interface switches 118. The interface switch 118, if used, can be positioned between the feeder line 115 and the main utility supply 110 so that the microgrid 117, comprised of the feeder line 115, the interconnected microsource systems 120, 130, 140, and 150, and the one or more loads 160, can be isolated from the utility supply 110. When the microgrid 117 is isolated from the utility supply 110, the microgrid 117 is said to be operating in "island mode." Similarly, when the microgrid 117 is connected to the utility supply 110, the microgrid 117 is said to be operating in "grid mode."

The interface switch 118, if used, can be positioned in other places, for example between portions of the microgrid 117, or between a particular microsource and the feeder line 115, thereby allowing a portion of the microgrid or a particular microsource to be operated in either island mode or grid mode.

When a microsource or microgrid operates in island mode, load tracking problems can arise because typical power sources in microsources, such as microturbines or fuel cells, tend to respond slowly, with time constants ranging from 10 to 200 seconds, and these types or power sources are generally inertialess. Conventional utility power systems store energy in the inertia of the spinning mass of a generator. When a new load comes online, the initial energy balance can be met by the system's inertia, which results in a slight reduction in system frequency. Because power sources in microsources are inertialess, a microsource will often include at least some power storage to ensure initial energy balance when loads are added during island mode.

Power storage for a microsource during island operation can come in several forms: batteries or super-capacitors on the DC bus; direct connection of AC storage devices (batteries, flywheels etc.); or use of local traditional generation that has inertia along with the microsource. Note that if a microsource never operates in island mode, the energy imbalance can be met by the utility supply, so power storage may not be necessary in that case.

In at least one of the exemplary embodiments, the microsource control methods described below can be used to control inverter interfaces found in fuel cells, photovoltaic panels, micro turbines, variable internal combustion engines, wind turbines, and storage technologies. Advantageously, communication among microsources is unnecessary for basic system control. Each inverter responds effectively to load changes without requiring data from other sources or locations.

Figure 2:
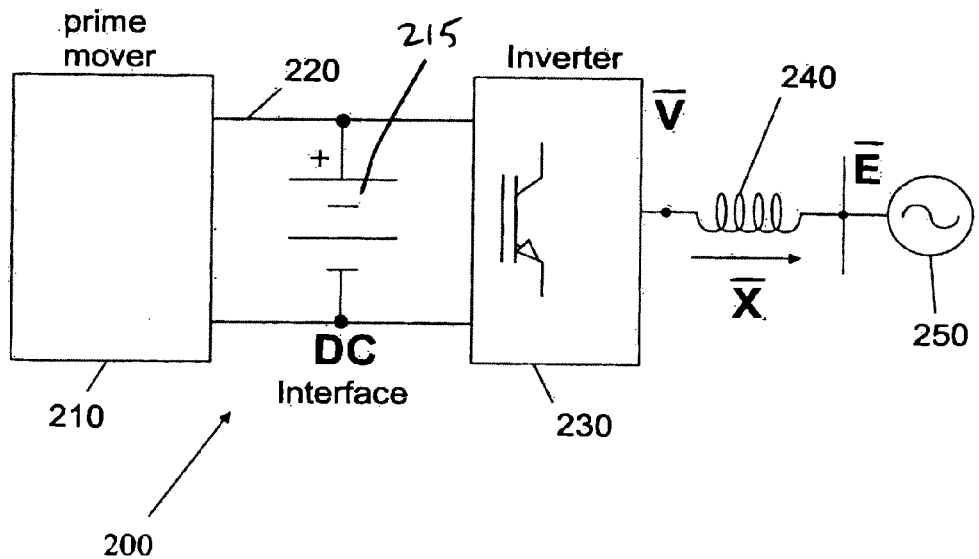
FIG. 2 is a diagram of an exemplary microsource that can be used in a distributed energy resource system such as that of FIG. 1.

FIG. 2 is a diagram of an exemplary microsource 200 that can be used in a distributed energy resource system such as that of FIG. 1. The microsource 200 can include a prime mover 210, a DC interface 220 and a voltage source inverter 230. The microsource 200 may also include power storage 215, for example a battery, although this is not required. The prime mover 210 can be, for example, a fuel cell, micro turbine, PV, or wind turbine. The controller for the microsource 200 is not shown in FIG. 2.

The microsource 200 couples, for example using an inductor 240, to a power system 250 that provides a system voltage $\bar{E}$ at the connection point between the microsource 200 and the power system 250. The inverter 230 controls both the magnitude and phase of its output voltage $\bar{V}$. The vector relationship between the inverter output voltage $\bar{V}$ and the system voltage $\bar{E}$ along with the reactance X of the inductor 240 determines the flow of real and reactive power (P & Q) between the microsource 200 and the system 250.

P & Q magnitudes are determined as shown in the equations (1), (2), and (3) below. When the power angle $\delta_p$ (the difference in phase between $\bar{E}$ and $\bar{V}$) is small, $\sin(\delta_p)$ is approximately $\delta_p$ and $\cos(\delta_p)$ is approximately 1, as can be seen from a power series expansion of sin(x) and cos(x). So, when $\delta_p$ is small, P is predominantly dependent on the power angle $\delta_p$, and Q is dependent on the magnitude of the output voltage $\bar{V}$ of the inverter 230. These relationships constitute a basic feedback loop for the control of output real power P and reactive power Q through regulation of the power angle $\delta_p$ and/or the inverter output voltage $\bar{V}$ in response to measurements of system voltage $\bar{E}$.

$$P = \frac{3}{2}\frac{VE}{X}\sin\delta_p \qquad [\text{Eq. 1}]$$

$$Q = \frac{3}{2}\frac{V}{X}(V - E\cos\delta_p) \qquad [\text{Eq. 2}]$$

$$\delta_p = \delta_V - \delta_E \qquad [\text{Eq. 3}]$$

In a system that includes a plurality of microsources such as the system 100 of FIG. 1, communication between microsources may be difficult or impossible especially when microsources come and go independently. Further, even if communication between microsources were possible, there may be no way to ensure cooperation between microsources owned or operated by independent entities. Advantageously, the control schemes of the present invention do not require any communication or coordination between microsources. Instead, the control schemes of the present invention depend only on measurements that are available locally, such as $\bar{V}$ and $\bar{E}$ in FIG. 2 or current flows, for example through the inductor 240.

Figure 3:
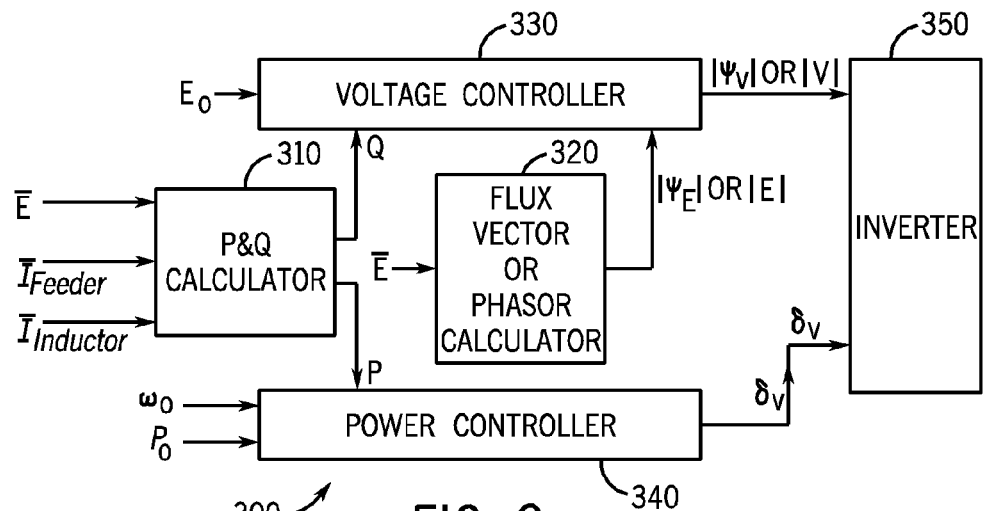
FIG. 3 is a diagram of an inverter control system that can be used with a microsource such as that of FIG. 2, in a distributed energy resource system such as that of FIG. 1.

FIG. 3 is a diagram of a controller 300 that can be used with a microsource such as that of FIG. 2, for example to control an inverter that regulates power flow from the microsource in a distributed energy resource system such as that of FIG. 1. The controller 300 can include a real and reactive power (P&Q)

calculator 310, a flux vector or phasor calculator 320, a voltage controller 330, a power controller 340, and an inverter 350 although it is not necessary that the controller 300 include all of these components. The controller 300 preferably has a fast response time on the order of a few milliseconds. The inverter 350 can be, for example, a pulse width modulation (PWM) inverter.

Exemplary inputs to the controller 300 can include three set points and three measured states. Set points can include $E_0$: the voltage set point at the output of the inverter; $P_0$: the power set point of power flow from the microsource; and $\omega_o$: the operating frequency set point of the inverter. Measured state variables can include $\overline{E}$: the system voltage at the connection point; $\overline{I}_{inductor}$: the time varying current injected by the microsource; and $\overline{I}_{feeder}$: the time varying current in the feeder. $\overline{I}_{inductor}$ would typically be used in a unit power control scheme, and $\overline{I}_{feeder}$ would typically be used in a zone power control scheme. All of these measured state variables can be obtained from instantaneous voltage or current measurements that can be made locally.

The controller 300 can supply one or more output variables to control the inverter 350. For example, the voltage controller 330 can supply the magnitude of the inverter output voltage flux $|\Psi_v|$ or the magnitude of the inverter output voltage $|V|$. The power controller can supply the phase angle of the inverter output voltage $\delta_v$.

The P & Q calculator 310 can have three inputs: $\overline{E}$, $\overline{I}_{inductor}$, and $\overline{I}_{feeder}$ which are used to calculate the real power P and the reactive power Q. The P & Q calculator 310 can calculate either the real power P being injected by the microsource using the inductor current, $\overline{I}_{inductor}$, or the real power P flowing through the feeder line using the feeder current, $\overline{I}_{feeder}$, depending on whether a unit power scheme or a zone power scheme is being implemented. The reactive power is the Q being injected by the microsource. The real power P can be supplied to the power controller 340, and the reactive power Q can be supplied to the voltage controller 330.

The flux vector or phasor calculator 320 can calculate the instantaneous magnitude $|\overline{E}|$ and phase $\delta_e$ of the system voltage $\overline{E}$ the point where the microsource is connected. Note that the phase $\delta_e$ of the system voltage $\overline{E}$ is not required by either the voltage controller 330 or the power controller 340 in the controller 300. The flux vector or phasor calculator 320 can also calculate the time-integral of the system voltage $\overline{E}$, referred to as the system voltage flux vector $\overline{\Psi}_e$.

$$\psi_E(t) = \psi_E(t_O) + \int_{t_o}^{t} E d\tau \quad \text{[Eq. 4]}$$

The system voltage flux vector $\overline{\Psi}_e$ can be calculated, for example, by transforming the three phase input phase voltages, $\overline{E}$, to the stationary d-q reference frame by means of [Eq. 5], where $e_{ds}(t)$ is the component of system voltage along a d axis of the d-q reference frame at time t, $e_{qs}(t)$ is the component of system voltage along a q axis of the d-q reference frame at time t, $e_a(t)$ is a first phase voltage of the three phase input voltage at time t, $e_b(t)$ is a second phase voltage of the three phase input voltage at time t, and $e_c(t)$ is a third phase voltage of the three phase input voltage at time t.

$$e_{ds}(t) = \frac{e_c(t) - e_b(t)}{\sqrt{3}} \quad \text{[Eq. 5]}$$

-continued
$$e_{qs}(t) = \left(\frac{2}{3}\right)\left(e_a(t) - \frac{1}{2}e_b(t) - \frac{1}{2}e_c(t)\right)$$

These voltages $e_{ds}(t)$ and $e_{qs}(t)$ can be integrated to yield the d-q components of the system voltage flux vector in rectangular coordinates:

$$\Psi_{ed} = \int_{-\infty}^{t} e_{ds}(\tau) d\tau \quad \text{[Eq. 6]}$$

$$\Psi_{eq} = \int_{-\infty}^{t} e_{qs}(\tau) d\tau$$

The system voltage flux vector in rectangular coordinates can then be transformed to polar quantities $|\Psi_e|$ and $\delta_e$:

$$|\Psi_e| = \sqrt{\Psi_e^2 + \Psi_{eq}^2} \quad \text{[Eq. 7]}$$

$$\delta_e = -\tan^{-1}\left(\frac{\Psi_{ed}}{\Psi_{eq}}\right)$$

The operation of the voltage controller 330 is explained further below in reference to FIGS. 4-6, and the operation of the power controller 340 is explained further below in reference to FIGS. 12-23.

Figure 4:
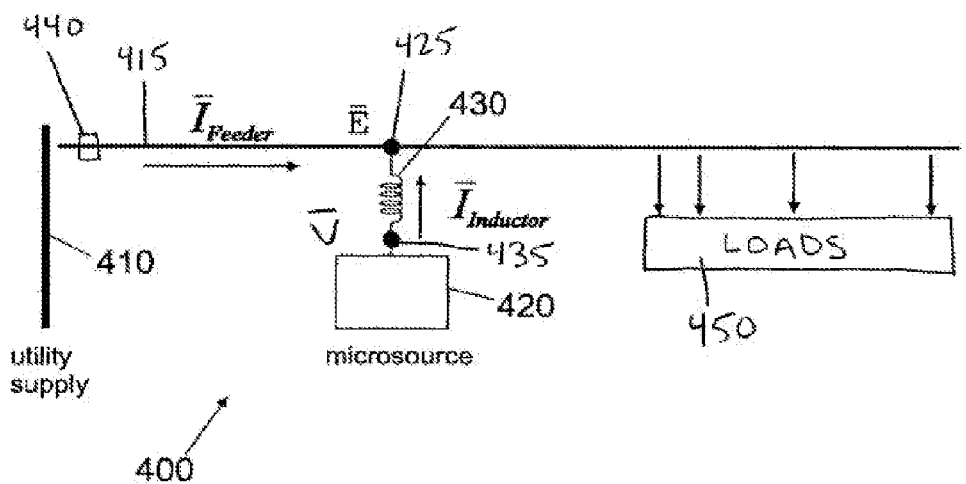
FIG. 4 is a diagram of the state variables in an exemplary distributed energy resource system, such as that of FIG. 1, that includes an exemplary microsource, such as that of FIG. 2.

FIG. 4 is a diagram of the state variables in a distributed energy resource system 400 that includes an exemplary microsource 420. The distributed energy resource system 400 includes a utility supply 410 providing a feeder current $\overline{I}_{feeder}$ through a feeder line 415, and a microsource feeder 420 providing an inductor current $\overline{I}_{inductor}$ through an inductor 430. A system voltage $\overline{E}$ can be measured at the external side 425 of the inductor 430 that connects to the feeder line 415. These state variables, $\overline{E}$, $\overline{I}_{feeder}$, and $\overline{I}_{inductor}$ are used by the P & Q calculator 310 described with reference to FIG. 3 to calculate real power P and reactive power Q, with $\overline{I}_{feeder}$ typically used in a zone power control scheme and $\overline{I}_{inductor}$ typically used in a unit power control scheme.

A microsource output voltage $\overline{V}$ can be measured at the internal side 435 of the inductor 430 that connects to the microsource output, for example an inverter output. The system 400 may include one or more loads 450. The system 400 may also include a switch 440 that can be opened to isolate the microsource 420 and loads 450 from the utility supply 410, and that can be closed to connect the microsource 420 and loads 450 to the utility supply 410.

Conventionally, integration of large numbers of microsources into a system is not possible with basic P-Q controls; voltage regulation is necessary for local reliability and stability. Without local voltage regulation, systems with high penetrations of microsources can experience voltage and or reactive power oscillations. Voltage regulation can ensure that there are no large circulating reactive currents between sources.

Figure 5:
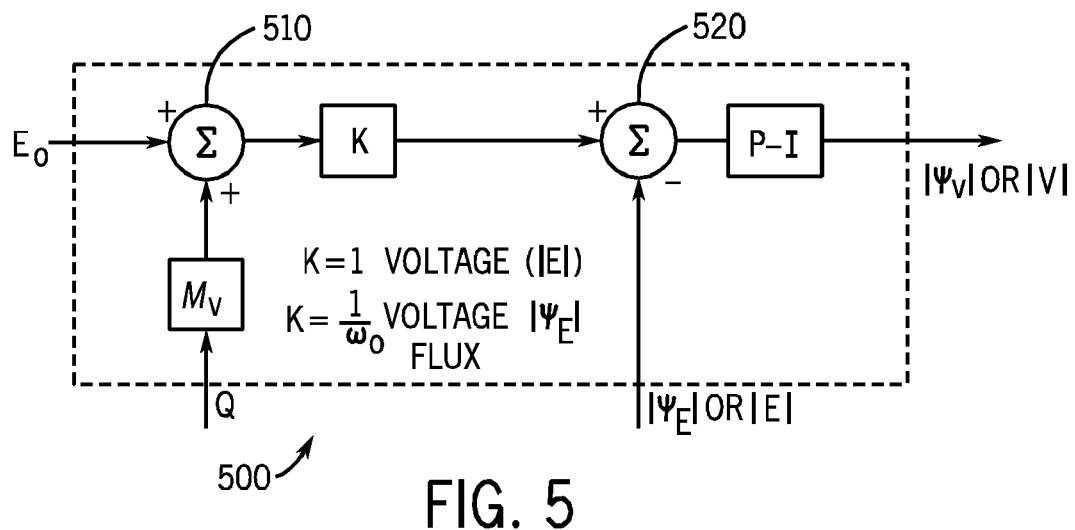
FIG. 5 is a diagram of a voltage controller in accordance with an exemplary embodiment of the invention for use in a microsource system.
Figure 6:
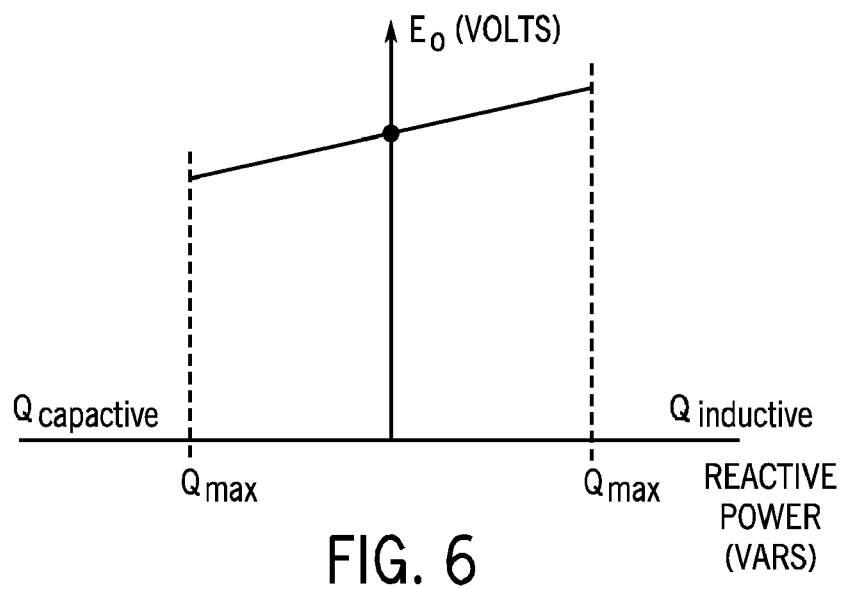
FIG. 6 is a graph of an exemplary voltage droop regulation characteristic for a voltage controller in a single microsource.

FIG. 5 is a diagram of an exemplary voltage controller 500 for use in a microsource system, which can be, for example, the voltage controller 330 described with reference to FIG. 3. There are three inputs to the exemplary voltage controller 500. One input is $E_0$, the inverter output voltage set point. Another input is Q, the reactive power being injected by the microsource. A third input is either the magnitude of the system voltage flux $|\Psi_e|$ or the magnitude of the measured system voltage |E|. The voltage controller 500 preferably includes voltage vs. reactive current droop with slope $M_V$ (explained further below).

The gain K depends on whether the magnitude of the system voltage flux $|\Psi_e|$ or the magnitude of the measured system voltage |E| is used in the calculation. In an exemplary embodiment, K=1 if the measured system voltage |E| is used in the calculation, and K=1/$\omega_o$ if the magnitude of the system voltage flux $|\Psi_e|\Psi$ is used.

In the exemplary voltage controller 500, the inverter output voltage set point $E_0$ is added to the product of the voltage droop slope $M_v$ and the reactive power Q using a summer 510. The resulting total is multiplied by the gain K. The resulting product is added to either the magnitude of the measured system voltage flux $|\Psi_e|$ or the magnitude of the measured system voltage |E| using a summer 520. The resulting difference between the drooped voltage set point and the measured system voltage is voltage error is input to a PI (proportional plus integral) controller, which can supply either the magnitude of the inverter output voltage flux $|T_v|$ or the magnitude of the inverter output voltage |V| to an inverter, such as the inverter 350 of FIG. 3.

The voltage regulation issues for microsources are similar to those involved in control of large synchronous generators. However, the impedance between generators in the power grid is usually large enough to greatly reduce the possibility of circulating currents. In contrast, the impedance between microsources in a distributed energy resource system may be relatively small, so small errors in voltage set points can give rise to relatively large circulating reactive currents which can exceed the ratings of the microsources.

For the foregoing reasons, the voltage controller 500 for a microsource in a distributed energy resource system preferably includes voltage vs. reactive current droop. FIG. 6 is a graph of an exemplary voltage droop regulation characteristic for a voltage controller on a microsource, such as the controller shown in FIG. 5. When the microsource generates capacitive reactive power, −Q, the voltage set point is lowered as defined by the slope. When the microsource generates inductive reactive power, Q, the voltage set point is increased.

Figure 7:
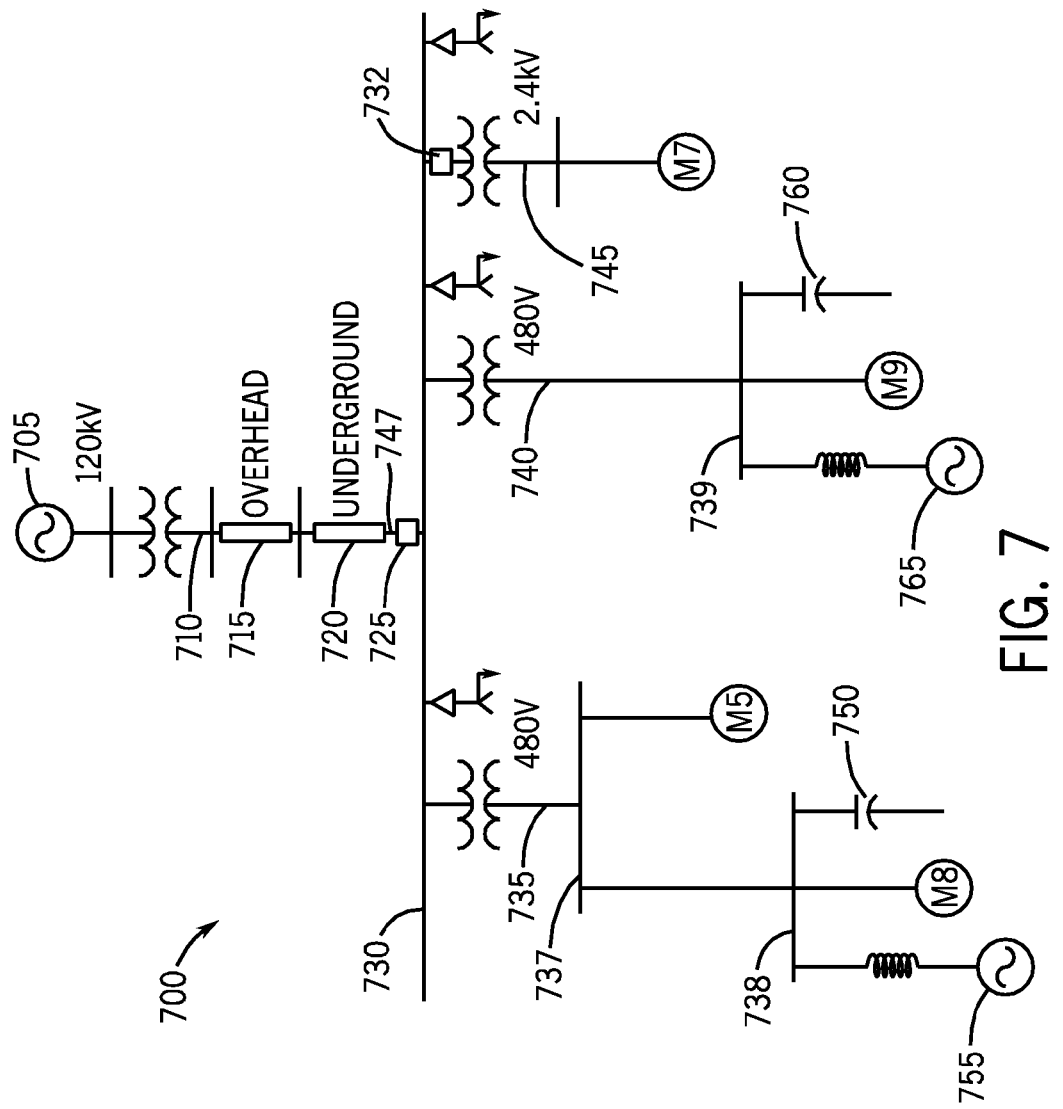
FIG. 7 is a diagram of an exemplary industrial plant including microsource systems in accordance with the invention.

FIG. 7 is a diagram of an exemplary industrial plant 700 including microsource systems in accordance with the invention. The exemplary industrial plant 700 can have high motor loads M5, M8, M7, and M9 that comprise, for example, 1.6 MW of motor load with motors ranging from 50 to 150 hp each, to illustrate the dynamics of the microsource controls described with reference to FIGS. 1-6. In this example, a 120 kV utility supply 705 provides power to the plant 700 through a long 13.8 kV feeder line 710 that includes overhead lines 715 and underground cables 720.

The feeder line 710 terminates in a switch 725 that connects the feeder line 710 to the power bus 730. The switch 725 can be opened to operate the plant 700 in island mode, disconnecting the entire plant 700 from the feeder line 710 and utility supply 705. The switch 725 can also be closed to operate the plant 700 in grid mode, with the plant 700 connected to the feeder line 710 and utility supply 705. The power bus 730 supplies power to three feeders, a first feeder 735 at 480V, a second feeder 740 at 480V, and a third feeder 745 at 2.4 kV. The third feeder 745 is connected to the power bus 730 by a second switch 732 that allows the third feeder 745 and its load M7 to be disconnected from the remainder of the plant 700.

In the exemplary plant 700, the loads on the 480V feeders 735 and 740 are presumed to be critical and must continue to be served if utility power is lost. The first 480V feeder 735 supplies power to bus 737, which serves load M5 and bus 738.

Bus 738 includes load M8, presumed to be an induction machine, capacitive voltage support 750, and a first microsource 755. The second 480V feeder 740 supplies power to bus 739, which serves load M9, presumed to be an induction machine, capacitive voltage support 760, and a second microsource 765.

The exemplary microsources 755 and 765 provide both power injection and local voltage support, and are each assumed to be rated at 600 KVA maximum power. When the microsources 755 and 765 are offline and not generating power, calculations show that the voltages of buses 738 and 739 are 0.933 and 0.941 per unit (pu, on 480-V base), respectively, and total losses are 70 kW. The microsource power injection is approximately one half the total power. With microsources 755 and 765 operating, the voltages on buses 738 and 739 are regulated at 1 pu. Because the power from the microsources is generated locally, the total losses drop to 6 kW, a reduction of 64 kW due to reduced transmission losses through the long 13.8 kV feeder line 710.

Figure 8A:
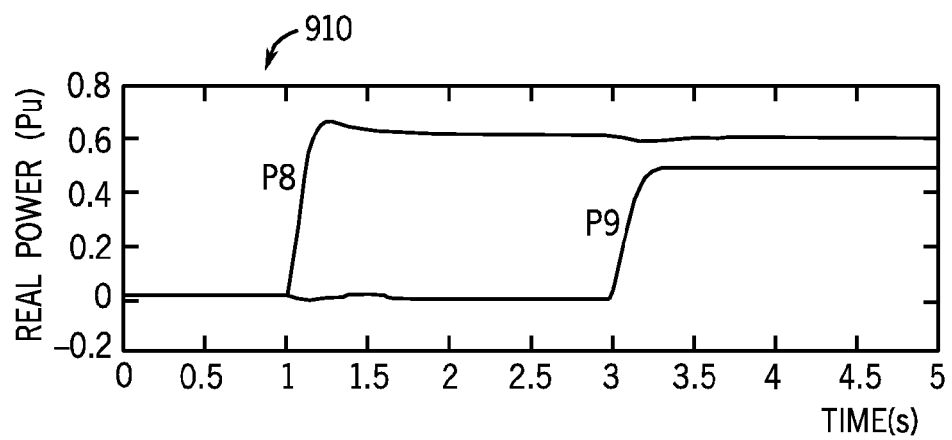
FIGS. 8(a) and 8(b) are graphs of predicted real power and reactive power, respectively, obtained using a computer simulation of the circuit of FIG. 7 as the exemplary microsources of FIG. 7 are brought online in grid-connected mode.
Figure 8B:
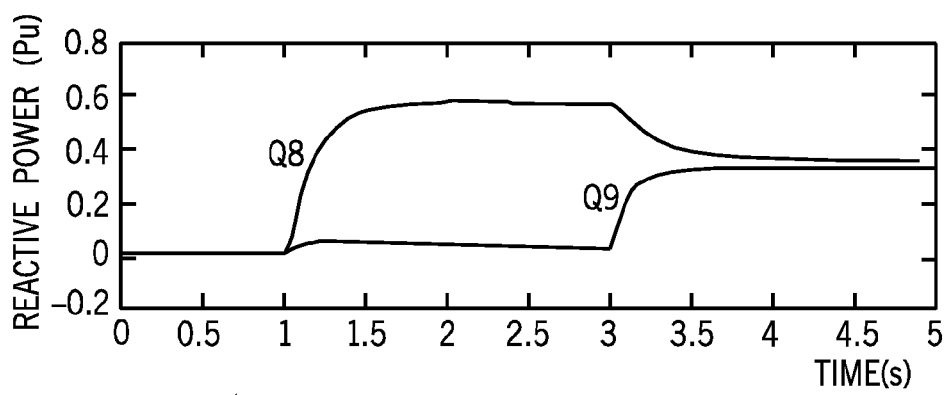

FIGS. 8($a$) and 8($b$) are graphs of predicted real power and reactive power, respectively, on bus 738 (P8, Q8) and bus 739 (P9, Q9) in the exemplary industrial plant 700. FIGS. 9($a$) and 9($b$) are graphs of predicted regulated voltage on bus 738 and bus 739, respectively, in the exemplary industrial plant 700. These results were obtained using a computer simulation of the circuit of FIG. 7 as the exemplary microsources 755 and 765 are brought online in grid-connected mode (with switches 725 and 732 both closed).

FIGS. 8($a$) and 8($b$) show the active and reactive power injections at the buses where units are located. In the initial state at t=0, microsources 755 and 765 are offline, so FIGS. 8($a$) and 8($b$) show zero real and reactive power injection. Similarly, FIGS. 9($a$) and 9($b$) show reduced voltages on buses 738 and 739 at t=0.

At t=1, microsource 755 on bus 738 is brought online with a power setting of 446 kW and local voltage control. Note the voltage correction shown as a slight rise at t=1 in graph 930 of FIG. 9($a$).

At t=3, microsource 765 on bus 739 is brought online with a power set point of 360 kW and local voltage control, which is reflected in a slight rise in voltage at t=3 in graph 940 of FIG. 9($b$). Note that FIG. 8($b$) shows the Q injection from microsource 755 (P8, Q8) to maintain local voltage magnitude at bus 738 drops at t=3 as the second microsource 765 (P9, Q9) is brought online.

This example can also be used to simulate island operation with power sharing through droop. In the exemplary plant 700, it is assumed that the combined power capacity of the microsources 755 and 765 is not adequate to supply the total load from loads M5, M8, M7, and M9. However, the combined power capacity of the microsources 755 and 765 is adequate to supply the combined load from loads M5, M8, and M9, which are assumed to be critical loads. For this reason, when the exemplary plant 700 transfers to island mode by opening switch 725, the second switch 732 can also be opened to disconnect feeder 745 and its associated load M7 from the main distribution bus 730.

Figure 10A:
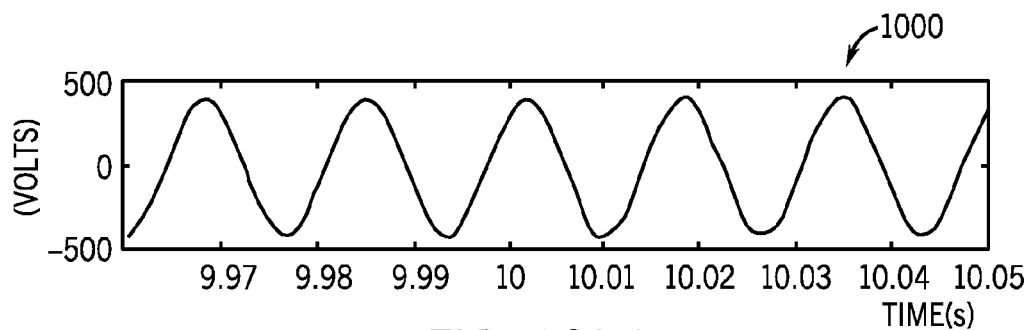
FIGS. 10(a), 10(b), and 10(c) are graphs of predicted regulated voltages on bus 738, bus 739, and the 13.8 kV feeder 710, respectively, in the exemplary industrial plant of FIG. 7, obtained using a computer simulation of the circuit of FIG. 7 during a transfer to island mode.
Figure 10B:
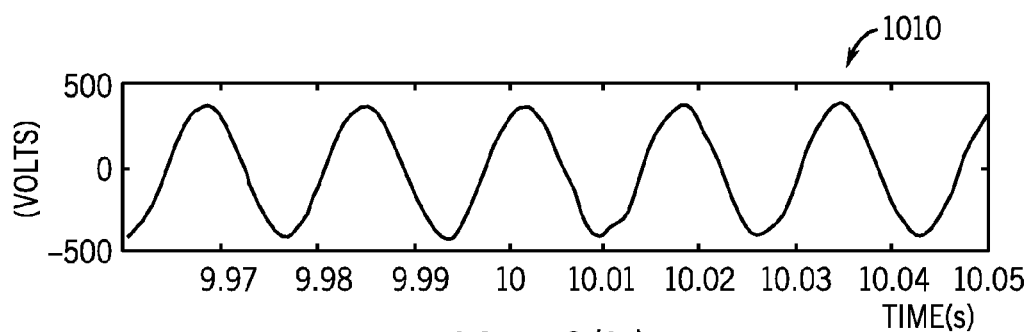
Figure 10C:
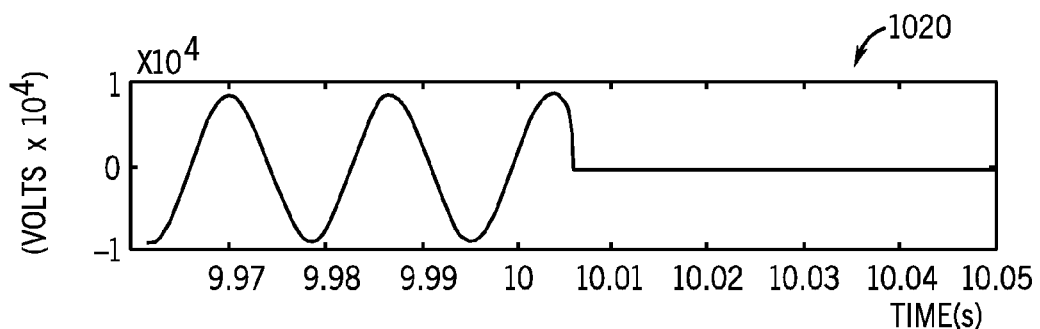

FIGS. 10($a$), 10($b$), and 10($c$) are graphs of predicted regulated voltages on bus 738, bus 739, and the external side 747 of the switch 725 at the 13.8 kV feeder, respectively, during a transfer to island mode by opening both switch 725 and switch 732 in response to a loss of power from the 13.8 kV feeder.

At t=10 seconds, the system moves from grid-connected to island operation by opening switch 725 to disconnect the plant 700 from the feeder 710 in response to the loss of power from the 13.8 kV feeder (where graph 1020 flattens). At the same time, the non-critical feeder 745 and its associated load M7 is disconnected from the remainder of the plant 700 by opening switch 732. Waveforms for bus 738 and 739 voltages during the switch to island mode are shown in graphs 1000 and 1010 in FIGS. 10(*a*) and 10(*b*), respectively. As shown in the graph, there is only a slight change from the sinusoidal steady state after t=10 seconds and the change lasts less than a cycle.

Figure 11A:
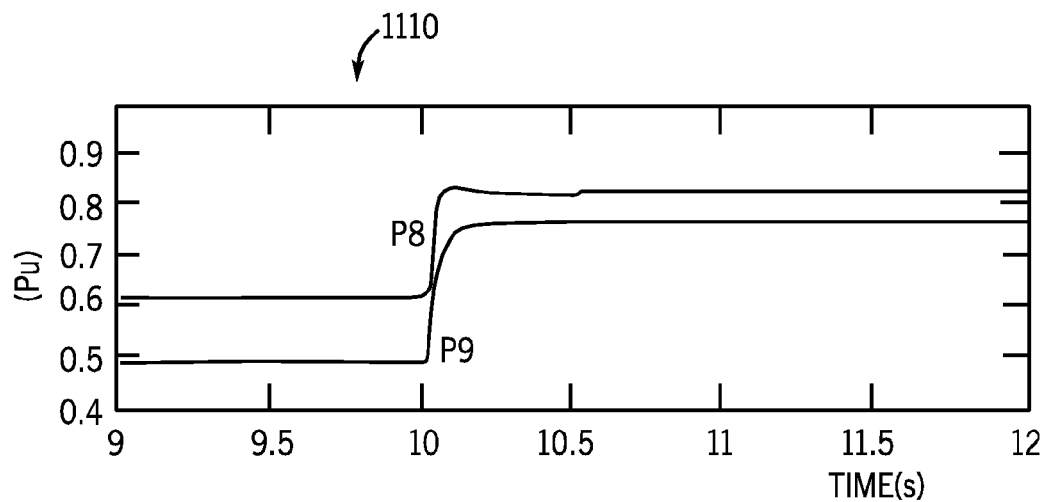
FIGS. 11(a) and 11(b) are graphs of predicted real power and reactive power, respectively, of the microsources in the exemplary industrial plant of FIG. 7, obtained using a computer simulation of the circuit of FIG. 7 during a transfer to island mode.
Figure 11B:
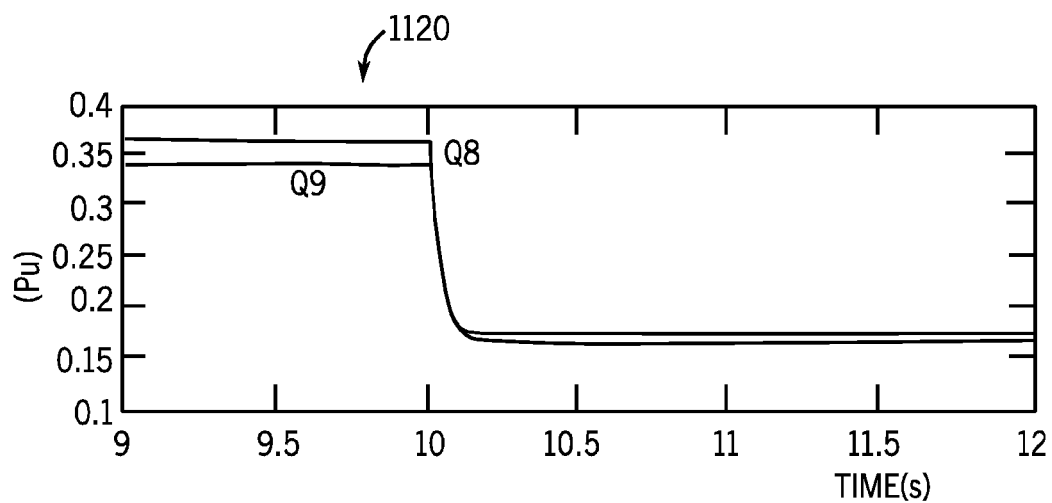

FIGS. 11(*a*) and 11(*b*) are graphs of predicted real power and reactive power, respectively, of the microsources 755 (P8) and 765 (P9) in the exemplary industrial plant of FIG. 7 during a transfer to island mode by opening both switch 725 and switch 732. Real power has to take up the critical load in the absence of grid power. Upon islanding, both microsources 755 and 765 increase their power injection as expected from the design of the droop characteristics. Microsource 765 is assumed to serve a lighter load M9 on bus 739.

As seen in the graph 1110, the power output of microsource 765 increases more than the power output of microsource 755 in response to the islanding, so microsource 765 is picking up the largest part of the new load demands. Reactive power injection reduces but holds the voltages at 1 pu. Power regulation takes place very rapidly, and steady-state power is restored in less than one second. In this case, system frequency droops a little more than 0.5 Hz.

As described with reference to FIGS. 1-11, a local controller at each microsource can insure stable operation in an electrical distribution system. This controller can respond in milliseconds and use local information to control the microsource during all system or grid events. Advantageously, communication among microsources is not necessary for basic system operation; each inverter is able to respond to load changes in a predetermined manner without data from other sources or locations. This arrangement enables microsources to "plug and play." That is, microsources can be added without changes to the control and protection of units that are already part of the system.

Figure 35:
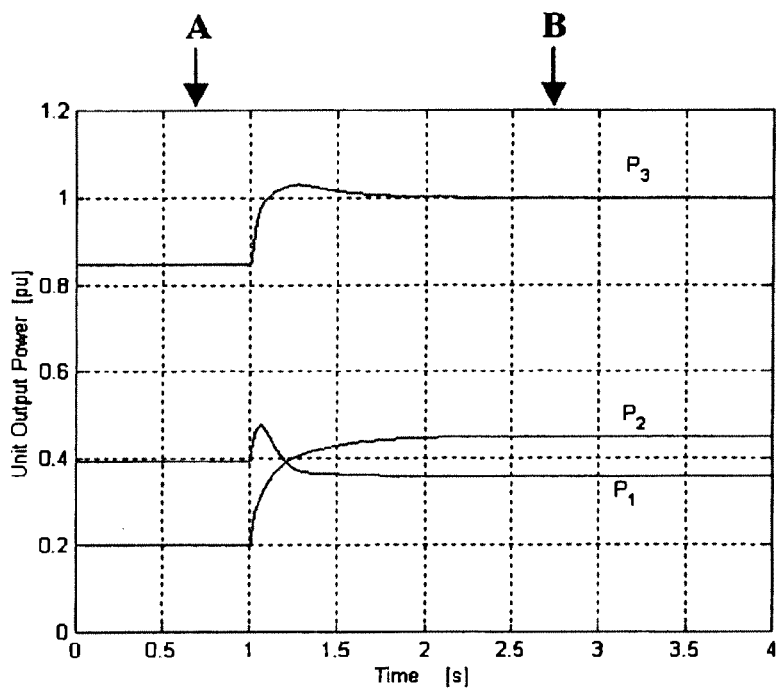
FIG. 35 is a graph of the predicted unit real power flow from the microsources in the exemplary system of FIG. 30, obtained using a computer simulation of a mix of zone and unit power control during a transfer to island mode.
Figure 36:
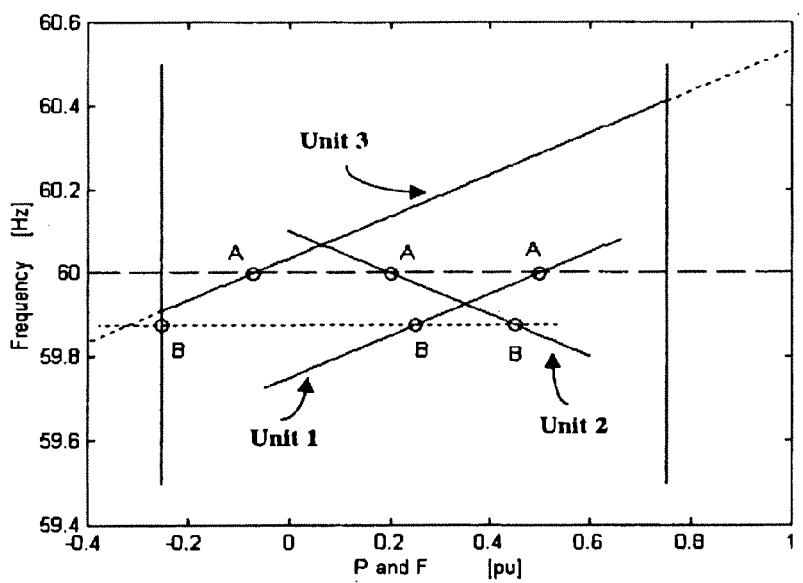
FIG. 36 is a graph depicting the relationship between steady state frequency vs. zone and unit power flow in a mixed zone and unit power control scheme applied to the system of FIG. 30, showing the steady state operation points (A)-(B) of FIGS. 34($a$)-34($b$), and FIG. 35.

Control schemes for a power controller in a system of distributed energy resources (DER), such as the power controller 340 in FIG. 3, can be classified into one of three broad classes: unit power control, zone power control, and a mixed system using both unit power control and zone power control. FIGS. 12-18 depict aspects of unit power control, and FIGS. 19-23 depict aspects of zone power control. FIGS. 24-29 depict simulations of unit power control, FIGS. 30-33 depict simulations of zone power control, and FIGS. 34-36 depict simulations of mixed unit and zone power control.

Figure 12:
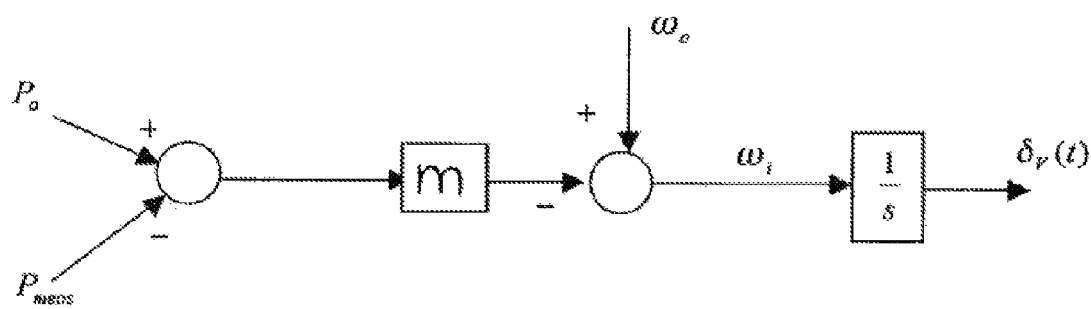
FIG. 12 is a diagram of a unit power controller in accordance with an exemplary embodiment of the invention for use in a microsource system.

FIG. 12 shows a basic unit power controller in accordance with an exemplary embodiment of the invention, based on [Eq. 8] below:

$$\omega_i = \omega_0 - m(P_0 - P_{meas}) \quad [\text{Eq. 8}]$$

Note that the input $\delta_E$ in FIG. 3, is not needed in the basic unit power controller according to the exemplary embodiment. This basic unit power controller uses a set point unit power flow $P_0$ and the measured power $P_{meas}$ to control the instantaneous operating frequency $\omega_i$ of the inverter by changing the operating phase angle of the inverter $\delta_v(t)$.

Figure 13:
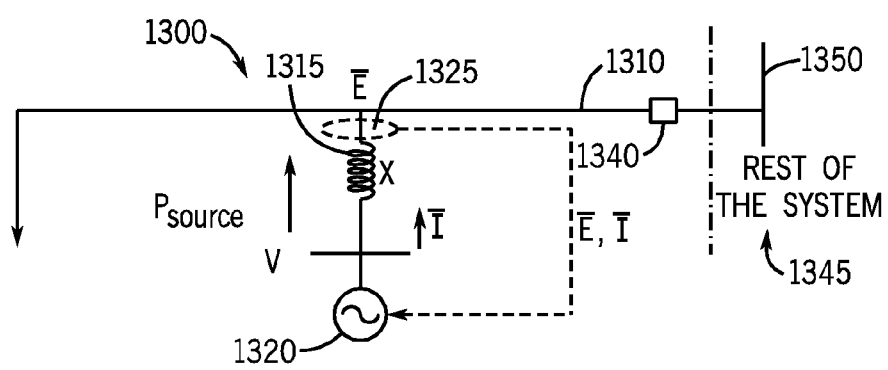
FIG. 13 is a diagram of a microgrid that includes a microsource implementing a unit power control scheme in accordance with an exemplary embodiment of the invention.

FIG. 13 is a diagram of an exemplary microgrid that includes a microsource with unit power control in accordance with an exemplary embodiment of the invention. The exemplary microgrid 1300 includes a local power bus 1310, at least one microsource 1320 connected to the power bus 1310 by an inductor 1315, and at least one load 1330. A switch 1340 may be provided, for example in the local power bus 1310. The switch 1340 can be opened to isolate the microgrid 1300 from the rest of the system 1345, which may include a utility grid 1350, and the switch 1340 can be closed to connect the microgrid 1300 to the rest of the system 1345. The microsource 1320 may include a controller able to measure a current through the inductor I and a system voltage E measured at the point 1325 where the inductor 1315 joins the power bus 1310.

When the microgrid of FIG. 13 is connected to the grid, load changes are matched by a corresponding power injection from the utility. This is because the unit holds its injection to a set point $P_0$. During island mode all the units participate in matching the power demand as loads change. Either a variable slope method or a fixed slope method can be used in a preferred embodiment of a unit power controller according to the invention. In either case the characteristics are described by [Eq. 8].

Figure 14:
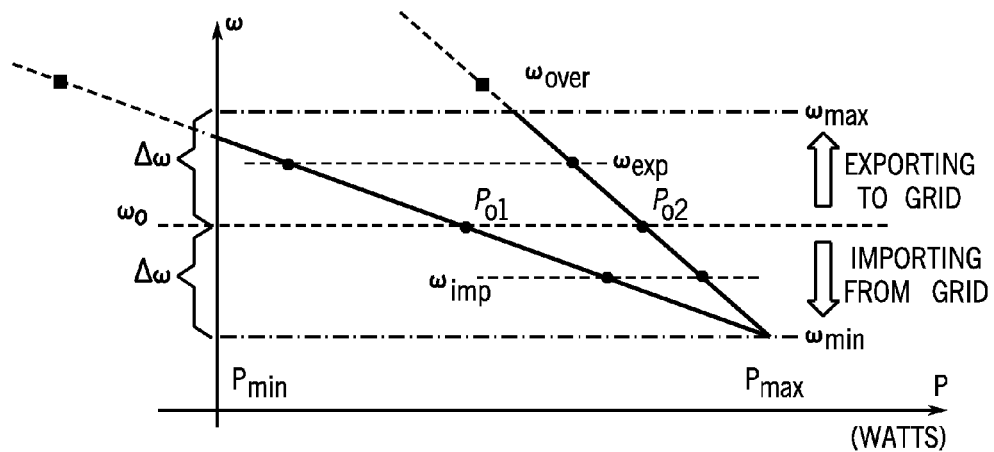
FIG. 14 is a graph depicting the relationship between steady state unit power vs. frequency (P-ω) in a unit power control scheme having a variable slope, for two exemplary microsources having different power set points.

FIG. 14 is a graph depicting the relationship between steady state unit power vs. frequency (P-ω) in a variable slope method for use in unit power control, for two exemplary microsources having different power set points. This is called a variable slope method because different microsources in the system can have different operating characteristics, each with its own slope that depends on the magnitude of its power set point.

In this example, the two microsources have different power set points, $P_{o1}$ and $P_{o2}$. When the microsources are connected to the grid, they produce power according to these respective power set points, $P_{o1}$ and $P_{o2}$, and they both operate at the same nominal frequency $\omega_o$. If the microsources were importing power from the grid before islanding, the two microsources both increase their power outputs when the system islands, by reducing their operating frequency. For the case where the microgrid was exporting power to the grid the power needs to be reduced when the system islands, resulting in a frequency increase.

The slope 'm' is variable, and for each microsource is a function of the power set point, $P_o$ and the maximum power output, $P_{max}$, of that microsource according to [Eq. 9]:

$$m = \frac{2\pi\Delta f}{(P_o - P_{max})} \quad [\text{Eq. 9}]$$

The higher the power set point, the steeper is the slope. By construction, maximum power is reached at minimum frequency in all units. During grid mode the system operates at system frequency, $\omega_o$, and the output power of each microsource unit matches its corresponding power setpoint, $P_{o1}$ and $P_{o2}$. During island mode the units must provide all the power for the loads.

If the units were importing from grid prior to transfer to island, then the units will ramp up their output to match the load's demand, by decreasing their instantaneous frequency until they reach steady state operating points, shown in FIG. 14 with circles at the resulting lower steady state frequency, $\omega_{imp}$.

Similarly, If the units were exporting from grid prior to transfer to island, then the units will decrease their output to match the load's demand, by increasing their instantaneous frequency until they reach steady state operating points, shown in FIG. 14 with circles at the resulting higher steady state frequency, $\omega_{exp}$.

If the units were exporting even more power, the theoretical steady state operating frequency could be an even higher frequency, $\omega_{over}$. At this higher frequency, $\omega_{over}$, the output power and operating frequency of the microsources could be outside their range of normal operation. For example, at an operating frequency $\omega_{over}$, unit 1 could be below its minimum power range and above its maximum frequency range. Similarly, at an operating frequency $\omega_{over}$, unit 2 could be above its maximum frequency range, although within its power range.

One characteristic of the variable slope method is that all units reach their maximum power output and their minimum frequency limit simultaneously. This is because the operating characteristics for all the units converge at the point of maximum power and minimum frequency. Although the units may reach steady state operating points having different output power levels, they will in general reach the same steady state operating frequency at any given time.

One of the advantages of the variable slope method is that all sources reach their maximum output together and there are no problems with limits on minimum frequency or maximum power. The use of variable slopes allows the power to increase more in the units that are less loaded (unit 1) and increase less in the units that are more loaded (unit 2).

If the system is engineered such that the combined power capacity of all the microsources in the system exceeds the maximum combined load in the system, then that total load can be matched with all the units injecting less than maximum power. In such a case, there is no need to enforce any limit on maximum power unless the load exceeds the aggregate power capacity of the units. All the units would reach maximum power at the same frequency, at about the same time.

The frequency corresponding to maximum power for all the units is the lower limit for the frequency range, $\omega_o - \Delta\omega$. Since all units cannot exceed maximum power, as seen before, then it follows that the units will not go beyond the lower limit for the frequency range.

One potential problem with this variable slope approach is that the minimum power limit, $P_{min}$, could be exceeded (see squares at frequency $\omega_{over}$ in FIG. 14) and a limit controller is needed to avoid it. Overfrequency is another potential problem with this variable slope approach. As shown in FIG. 14, it is possible to reach a steady state at a frequency $\omega_{over}$ that is larger than the maximum limit for the frequency, $\omega_o + \Delta\omega$ and there is no mechanism to prevent that.

Figure 15:
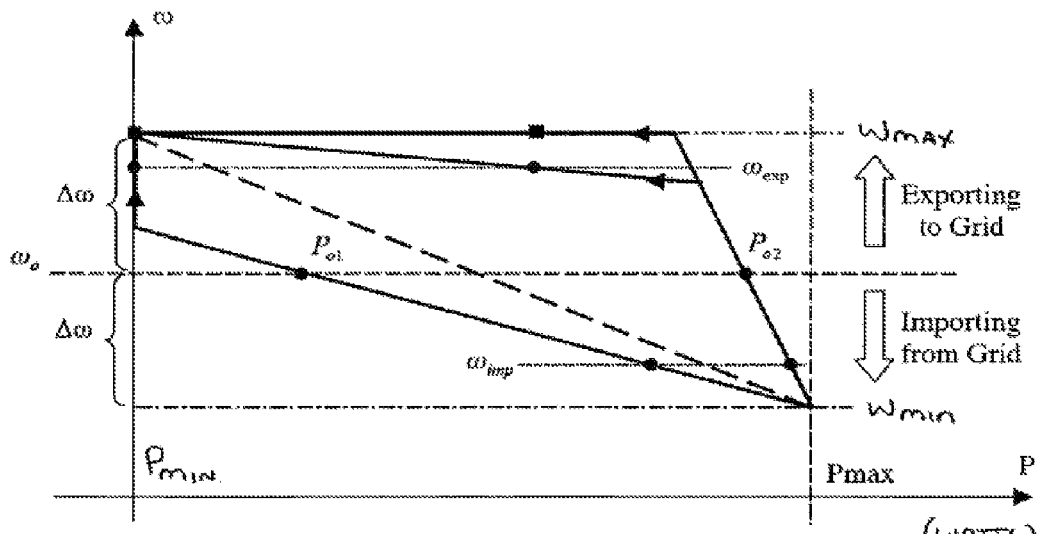
FIG. 15 is a graph depicting the relationship between steady state unit power vs. frequency (P-ω) in a unit power control scheme having variable slope with power and frequency limits, for two exemplary microsources having different power set points.

FIG. 15 is a graph depicting the relationship between steady state unit power vs. frequency (P-$\omega$) in a variable slope method with power and frequency limits for use in unit power control, for two exemplary microsources having different power set points. During operation below the maximum frequency and above the minimum power limit of each microsource, the slope is variable and depends on the power set point, $P_o$ and the maximum power output, $P_{max}$, of that microsource according to [Eq. 8], as in the scheme of FIG. 14.

In this approach, the steeper slopes are switched to a flatter characteristic. The change of slope could occur at any frequency between $\omega_o$ and $\omega_o + \Delta\omega$. The flatter characteristics will all have P=0 at maximum frequency. The change of slope is performed for all the power set points $P_{oi}$ larger than half of maximum power $P_{max}$. This setpoint ($P_{oi} = P_{max}/2$) is shown with a dashed thick line on FIG. 15.

Like in the preceding case, power imported from the grid implies a lowering of the frequency in island, to a value like $\omega_{imp}$. If power was exported while connected to grid, then in island the frequency would increase to $\omega_{exp}$. The value of this new frequency depends on how the characteristic is switched from steep to flatter.

If the slope is switched at any intermediate frequency between nominal and maximum limit, then the operating point would be at a frequency like $\omega_{exp}$ in FIG. 15, with the operating points shown as circles. In this case the flatter part of the slope has a non zero rate of change.

If the slope is switched at the maximum frequency, then the flatter part of the slope has zero rate of change: it is horizontal. In this condition the operating points will result to be at this frequency (the maximum frequency that is held) and are shown with squares on FIG. 15. Notice that this power dispatch equals exactly the power dispatch that was previously obtained at the frequency $\omega_{exp}$.

The maximum power limit is automatically enforced for the same reasons already seen when analyzing the characteristics in FIG. 14. The minimum power limit is enforced differently depending on whether the power set point $P_{oi}$ is above or below half the maximum power capacity $P_{max}$ of the microsource.

If $P_{oi} < P_{max}/2$, then there is no switch to a flatter slope (like for unit 1). In this case the steady state characteristic is switched to vertical slope as soon as P=0. The steady state operation is constrained to belong to this vertical part of the characteristic: as the load decreases, frequency increases at a constant power, P=0, as shown by the arrow in FIG. 15.

If $P_{oi} > P_{max}/2$, then the slope is switched to a flatter slope (potentially horizontal). No matter what is the slope of the flatter part, all characteristics will reach the operating point at P=0 and maximum frequency, moving in the direction of the arrows (FIG. 15) as load decreases.

Minimum frequency limit cannot be exceed as a consequence of the fact that maximum power cannot be exceeded. Indeed, the only way that the minimum limit on frequency can be exceeded is if the limit on maximum power is also exceeded, i.e. there are more loads than generation in the microgrid.

Maximum frequency limit cannot be exceeded because of the same reasons the minimum cannot be exceeded. Any higher frequency that this limit would imply that the loads are actually injecting power into the system.

This approach correctly enforces the limits on the frequency and the power. At higher setpoints, the slope could became very steep at the point of compromising stability. The problem of stability could be solved by assigning a maximum slope that the characteristic is allowed to have. Since the slope is a function of the power setpoint, then this would effectively translate into a limit on the maximum power setpoint. Microsources are expected to operate most of their time with power outputs near maximum because of the better efficiencies enjoyed at higher operating points. Limiting the maximum power that can be injected during grid connection still implies that during island the unit may end up operating at full maximum power. (i.e. suppose that $P_{o2}$ is max power setpoint, then in island at frequency $\omega_{imp}$ power output would be larger than $P_{o2}$ and it could go up to $P_{max}$, if loads increase, without problems).

Figure 16:
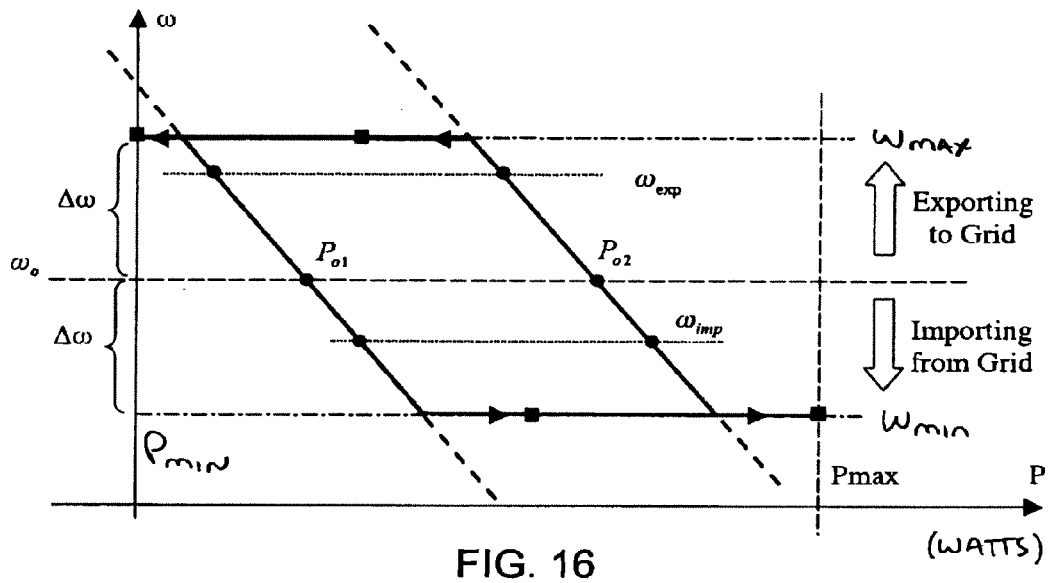
FIG. 16 is a graph depicting the relationship between steady state unit power vs. frequency (P-ω) in a unit power control scheme having a fixed slope, for two exemplary microsources having different power set points.

FIG. 16 is a graph depicting the relationship between steady state unit power vs. frequency (P-$\omega$) in a fixed slope method for use in unit power control, for two exemplary microsources having different power set points. In the approach of FIG. 16, the slope of the steady state characteristic is held constant so this control characteristic is called "fixed slope." This fixed slope can be steeper than the minimum slope (see [Eq. 10]). This minimum value is defined by the fact that frequency will change by $\Delta\omega$ as power changes by $\Delta P$ (the approach using the minimum slope is dealt in FIG. 17).

Power set points are tracked in grid mode, and upon islanding the frequency readjusts up or down as already seen. For instance, if power was being imported from the grid in grid mode, after islanding the frequency of each microsource will drop below $\omega_o$ to $\omega_{imp}$ as the units supply the power that was injected by the grid before islanding. Unlike the approach with the variable slope, each unit increases output power to meet the power demand the same amount, regardless of their respective power set points before islanding.

A steady state horizontal characteristic is enforced at maximum and minimum frequencies allowing power to change at those frequencies. The slanted characteristics are only valid within limits of power and frequency, the part outside of the limits (dashed lines) are replaced with the horizontal steady state characteristics to enforce frequency limits. For instance if the system in island is operating at frequency $\omega_{imp}$ and the load suddenly increases, then the operating point may end up at the minimum frequency, represented by the squares. The steady state operating points would move on the characteristic, following the arrows (FIG. 16) as load increases.

The case where the system was exporting to grid would lead to frequency $\omega_{exp}$ in island, and a lower load may bring operation to the maximum frequency, shown with squares. Maximum and minimum frequencies can be reached, but the fact that the characteristic with constant slope is switched to horizontal at those frequencies prevents any operation point from ever exceeding the limits. Maximum and minimum output power is enforced by ensuring that the steady state characteristics do not extend over these limits: for instance, the operating point at maximum frequency for unit 1 is P=0 is held fixed unless the load increases.

This steady state characteristic configuration has the advantage of being stable across its range (as long as the slope is not chosen too large) and of enforcing both limits on power and frequency. The only disadvantage is that both limits in frequency and power need to be actively enforced. In contrast, in the method of FIG. 15 the limit $P_{max}$ was automatically enforced by assuming enough generation and the limit on the minimum frequency also was inherently enforced because of the fact that power could not exceed maximum.

Figure 17:
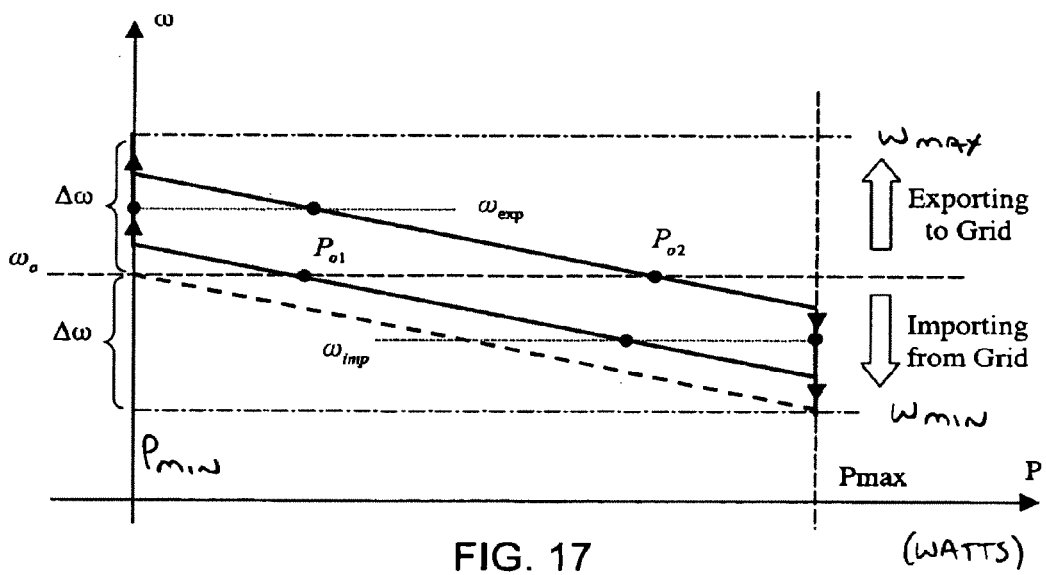
FIG. 17 is a graph depicting the relationship between steady state unit power vs. frequency (P-ω) in a unit power control scheme having a fixed minimum slope, for two exemplary microsources having different power set points.

FIG. 17 is a graph depicting the relationship between steady state unit power vs. frequency (P-ω) in a fixed minimum slope method for use in unit power control, for two exemplary microsources having different power set points;

$$m = -\frac{\Delta\omega}{P_{max}} \qquad [\text{Eq. 10}]$$

This slope allows power to change between P=0 and P=$P_{max}$ as frequency changes by $\Delta\omega$, shown in FIG. 17 with the thick dashed line. All the other characteristics are simply parallel to this one. If the system was importing from the grid before islanding, then the resulting frequency, $\omega_{imp}$ will be smaller than the system frequency $\omega_o$, as already seen. It is possible that one of the units reaches maximum power in island mode, as shown by unit 2 at frequency $\omega_{imp}$.

The steady state characteristic slope switches to vertical as soon as the maximum power limit has been reached and the operating point moves downward vertically as shown by the arrows in FIG. 17 as load increases. Opposite considerations take place when unit is exporting and new frequency $\omega_{exp}$ is larger than nominal. It is possible that if the load is very small that one of the units has reached the limit P=0. At that point, the slope of the characteristic is switched to vertical and as load decreases, the operating point moves upwards, as shown by the arrows in FIG. 17.

The minimum and maximum power limits are enforced by the fact that the characteristics with constant slope are switched to vertical steady state characteristics. The minimum and maximum frequency limits cannot be overshot because it would imply, respectively, that the load has exceeded the overall generation capability or that the load is actually injecting power into the system. These last two limits do not need to be explicitly enforced since the assumption on the load (smaller than sum of all generation, but never smaller than zero) automatically implies behavior within limits.

Figure 18:
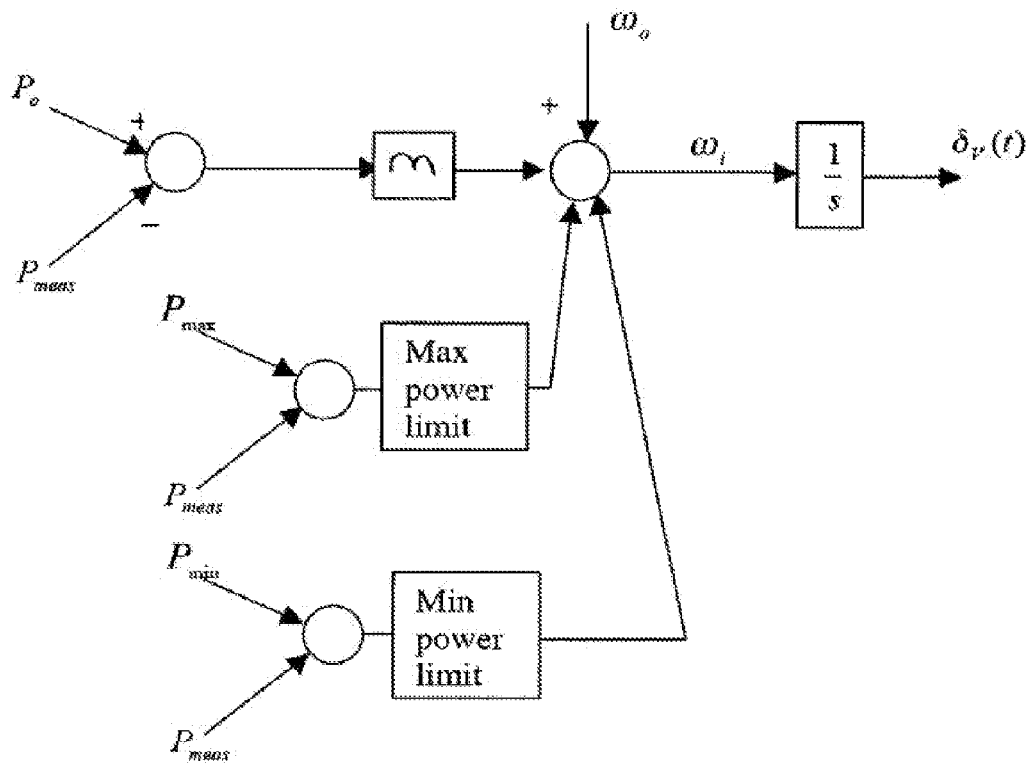
FIG. 18 is a diagram of a unit power controller with upper and lower power limits in accordance with an exemplary embodiment of the invention.

FIG. 18 is a diagram of a unit power controller with upper and lower power limits in accordance with an exemplary embodiment of the invention. This approach has the advantage of being able to enforce both limits in power and frequency. For the fixed minimum slope only power limits need to be enforced, frequency limits come as a consequence.

Figure 19:
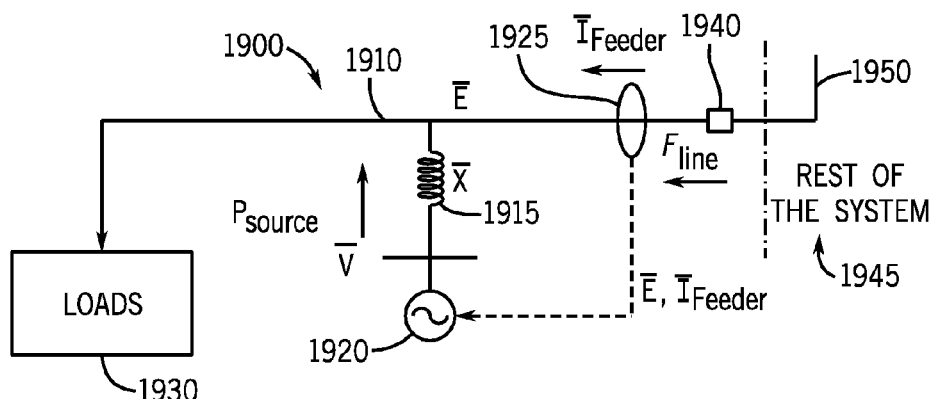
FIG. 19 is a diagram of a microsource implementing a zone power control scheme in accordance with an exemplary embodiment of the invention.

FIG. 19 is a diagram of a microgrid containing an exemplary microsource with zone power control in accordance with an exemplary embodiment of the invention. The exemplary microgrid 1900 includes a local power bus 1910, at least one microsource 1920 connected to the power bus 1910 by an inductor 1915, and at least one load 1930. A switch 1940 may be provided, for example in the local power bus 1910. The switch 1940 can be opened to isolate the microgrid 1900 from the rest of the system, which may include a utility grid 1950, and the switch 1940 can be closed to connect the microgrid 1900 to the rest of the system. The microsource 1920 may include a controller able to measure a system voltage E where the microsource 1920 is connected to the local power bus 1910, and a current $\bar{I}_{feeder}$ between the local power bus 1910 and the rest of the system 1945, measured at the point 1925.

Zone power control is another way to control the power in a system of DERs, by controlling power flow in zones instead of by controlling the power flow from each microsource. To reduce confusion we use the symbol, F, for power flow in a zone and P for the output of a source. FIG. 19 shows the setup: when connected to the grid, every load change is matched by a different power injection from the unit since the control holds the flow of power coming from the grid, $F_{line}$, to a constant value. During island mode all the units participate in matching the power demand as loads change.

Figure 20:
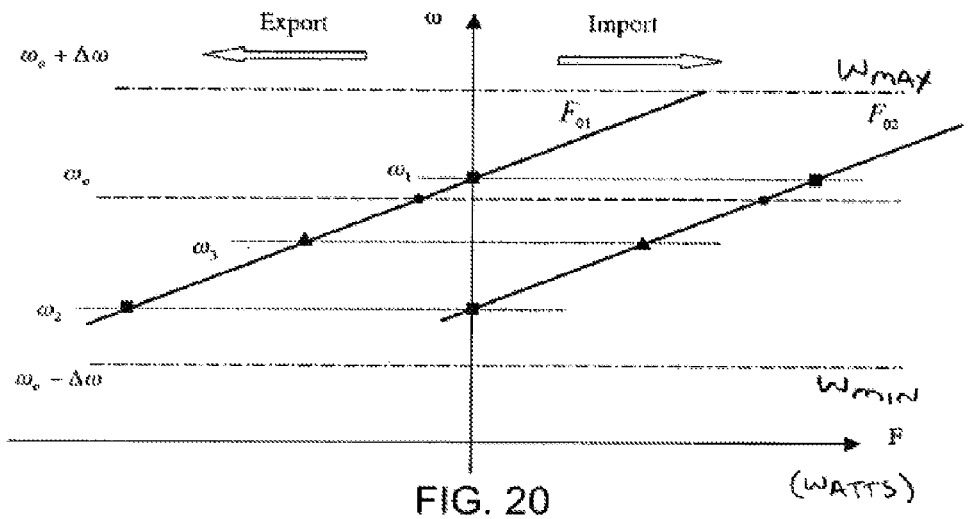
FIG. 20 is a graph depicting the relationship between steady state zone power vs. frequency (P-ω) in a zone power control scheme having a fixed minimum slope, for two exemplary microsources having different power set points.

FIG. 20 is a graph depicting the relationship between steady state zone power vs. frequency (P-ω) in a method for use in zone power control, for two exemplary microsources having different power set points. The characteristics enforce the following relation:

$$\omega_i = \omega_o - m_F(F_{o,i} - F_i) \qquad [\text{Eq. 11}]$$

This expression is very similar to [Eq. 8] used for unit output power control. The slope is fixed at the minimum slope, [Eq. 10], but has a reversed sign ($m_F=-m$, the characteristics are slanted the opposite way). The sign needs to be reversed because of the relation between the output power, P and the zone flow F. This relation can be derived by inspection of FIG. 17:

$$F_{line} + P_{source} = \text{Load} \qquad [\text{Eq. 12}]$$

In [Eq. 12], $F_{line}$ is the power (imported means positive) from the rest of the system, and $P_{source}$ is the power injected or absorbed by the unit. The power injected or absorbed by the unit is assumed to be greater than the minimum power output of the unit, $P_{min}$, and less than the maximum power output of the unit, $P_{max}$. For a microsource capable of power injection only $P_{min}$ will be positive or zero, while a bidirectional device capable of both power injection or power storage may have $P_{min}<0$. Load is the overall loading level seen by the unit. The relationship of [Eq. 12] implies that to increase F one needs to decrease P and vice versa, hence the reverse sign in the slope when moving from the P-ω plane to the F-ω plane.

During connection with the grid the flows in the zones track the requested values, $F_{o,i}$, at the system frequency, $\omega_o$. When the microgrid transfers to island, the two units readjust the flow dispatch depending on the geometrical configuration of the units in the field.

Figure 21:
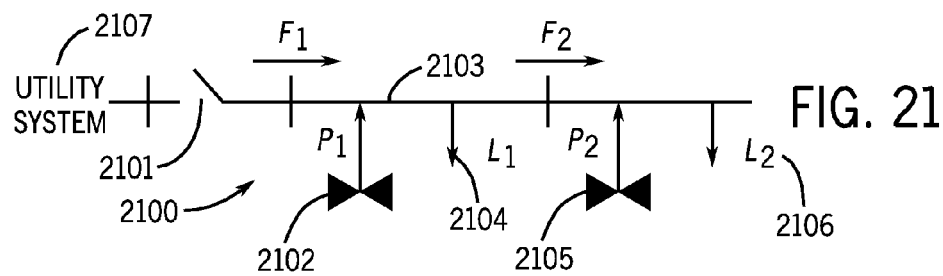
FIG. 21 is a diagram of an exemplary system with two microsources installed in a single zone.
Figure 22:
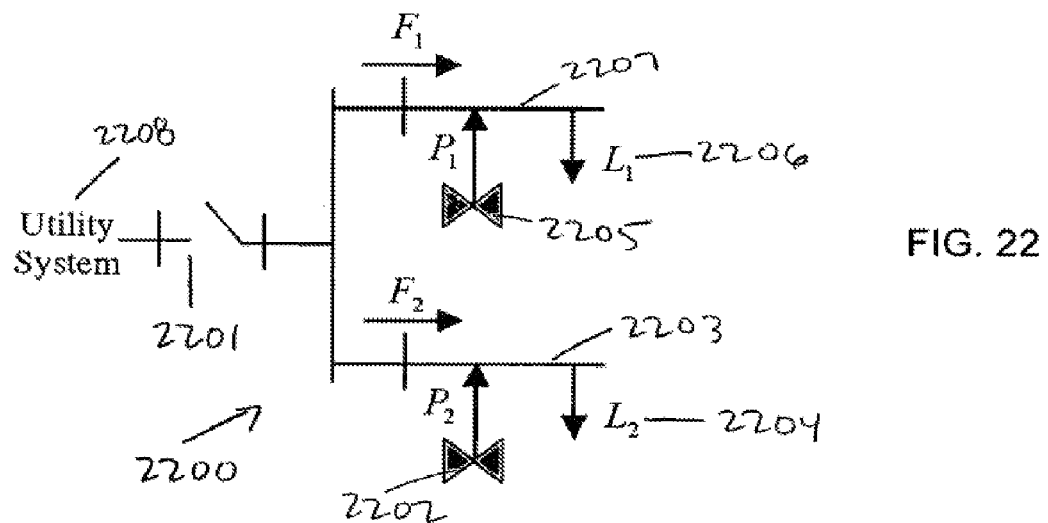
FIG. 22 is a diagram of an exemplary system with two microsources installed in two zones.

FIGS. 21 and 22 are diagrams of two microsources installed in a single zone and in two zones, respectively. The use of two microsources in a single zone in FIG. 21 is for illustrative purposes only, and there can be a greater or lesser number of microsources in a single zone. Similarly, the use of two zones each with a single microsource in FIG. 22 is also for illustrative purposes only, and there can be a greater or lesser number of zones, and the number of microsources in each zone may be different.

FIG. 21 shows a single-zone microgrid 2100 having two microsources 2102 and 2105, and two loads 2104 and 2106 on a local power bus 2103, and connected by an interface switch 2101 to a utility system 2107. FIG. 22 shows a two-zone microgrid 2200 having a first zone with a microsource 2202 and a load 2204 on a first local power bus 2203 and a second zone with a microsource 2205 and a load 2206 on a second local power bus 2207, with the microgrid 2200 connected by an interface switch 2201 to a utility system 2208.

In a zone control method for the circuit of FIG. 21, during island the switch 2101 will open, so the flow nearest to utility must be zero. FIG. 20 shows that flow of unit 1 is the one nearest to the utility, so in island the system will operate at the frequency $\omega_1$, where flow of unit one is zero. The operating points are shown with squares at that frequency. Frequency $\omega_1$ is larger than the nominal system frequency because the system was exporting to the grid ($F_{o1}$ is negative) prior to disconnection, which is the same behavior seen with unit output power control. If, for instance, the two characteristics of FIG. 21 are swapped (i.e. replace $F_{o1(new)}=F_{o2(old)}$ and $F_{o2(new)}=F_{o1(old)}$), then the frequency in island would be $\omega_2$. This time the frequency is lower than nominal, and that is because the microgrid was importing from the grid prior to disconnection.

In a zone control method for the circuit of FIG. 22, during island the frequency takes the value where the sum of the flows is zero. On FIG. 20, the frequency in island is $\omega_3$, exactly where $F1=-F2$. The operating points are shown with triangles at that frequency.

Figure 23:
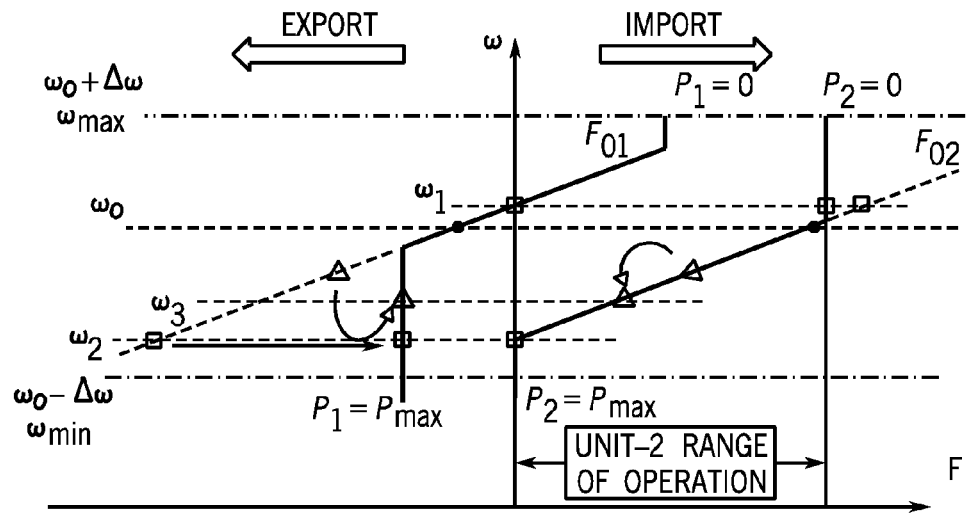
FIG. 23 is a graph depicting the relationship between steady state zone power vs. frequency (P-ω) in a zone power control scheme having fixed minimum slope and unit power limits, for two exemplary microsources having different power set points.

So far it was assumed that all the units operate within their limits of power and frequency. As seen in FIG. 17, the choice of the minimum slope value guarantees operation within frequency limits across the whole operating range of output power but it requires the unit output power limits to be actively enforced. The limits on output power variable, P, are projected on the zone flow variable, F, as shown in FIG. 23. These regions slide as the loads change their operating points. But in all cases a unit must operate between its maximum and its minimum power points.

FIG. 23 is a graph depicting the relationship between steady state zone power vs. frequency (P-$\omega$) in a method with unit power limits for use in zone power control, for two exemplary microsources having different power set points. FIG. 23 shows unit 1 during island operation will operate at frequency $\omega_1$, where flow $F_1$ is zero. And the output of unit 2 has reached its zero limit. Note solid squares on the $\omega_1$ line. Of course this implies that unit one is providing all needed power. The islanding events at $\omega_2$ & $\omega_3$ show the enforcement of maximum power limits.

Figure 24:
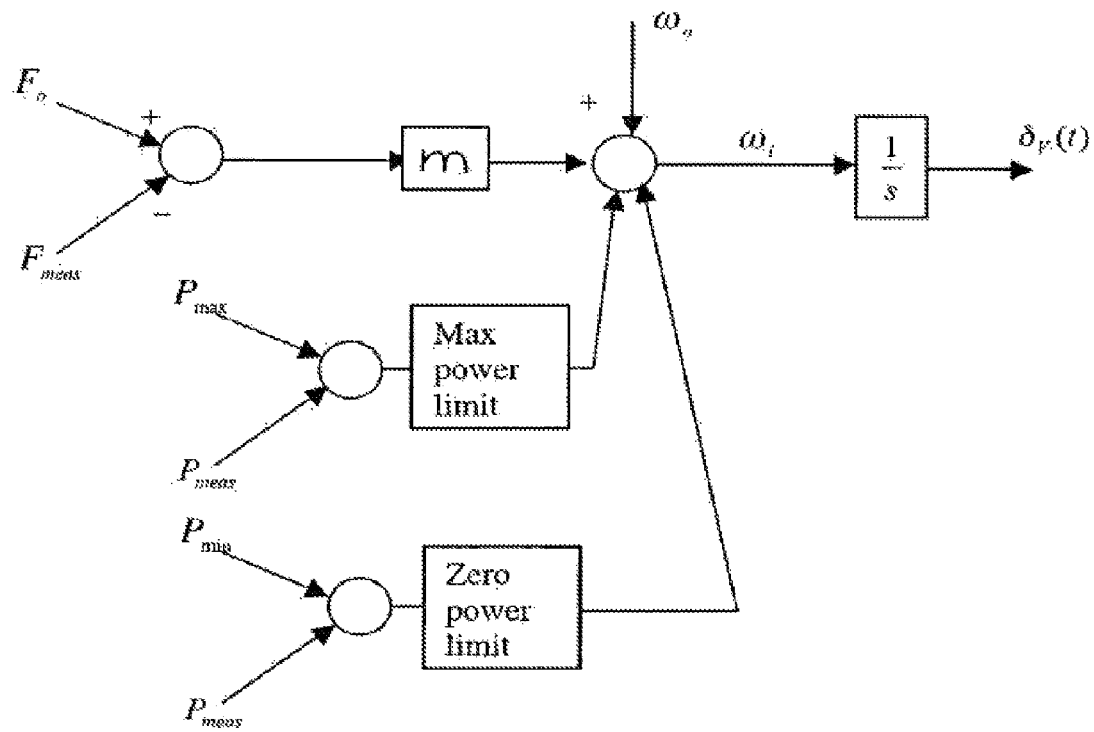
FIG. 24 is a diagram of a zone power controller with upper and lower unit power limits in accordance with an exemplary embodiment of the invention.

FIG. 24 is a diagram of a zone power controller with upper and lower unit power limits in accordance with an exemplary embodiment of the invention. The controller for zone power flow of FIG. 24 is almost identical to the unit power controller of FIG. 18. The differences are in gain and inputs. First, the slope, m, in the zone power controller of FIG. 24 is negative relative to the slope, m, in the unit power controller FIG. 18. Second, the zone power controller of FIG. 24 takes as inputs the zone power flow set point, $F_o$, and measure zone power flow, $F_{meas}$.

The upper and lower unit power limits $P_{min}$ and $P_{max}$ are still required in a zone power controller, since the unit power limits must be enforced. The limits are enforced by injecting a $\Delta\omega$ offset when a limit is reached, for the maximum power limit $\Delta\omega\leqq0$, while for the minimum power limit $\Delta\omega\geqq0$. When the system is not at a limit $\Delta\omega\equiv0$. Note that the limiters assume that the power measurement can become negative. The control scheme of FIG. 24 will allow both methods of operation provided the external inputs are available.

From an installation perspective several items may need to be set externally; value of m including its sign, maximum and minimum power values of the unit, gains in the limiters, and the value of $\omega_0$. The power flow set point needs to be part of the energy management system (EMS).

FIGS. 25-29 depict computer and hardware simulations of unit power control of the exemplary system of FIG. 21 which includes two microsources arranged in a single zone. These simulations show the behavior of the system of FIG. 21 when operated using the fixed value, minimum slope approach shown in FIG. 17 and subjected to load changes that cause the microsources to reach their limits.

When all the units control output power, then the quantities P1 and P2 are controlled. When all the units control zone flow, then the quantities F1 and F2 are controlled. In a mixed system that includes both unit power control and zone power control, it is necessary to specify which unit controls P and which controls F.

Figure 25A:
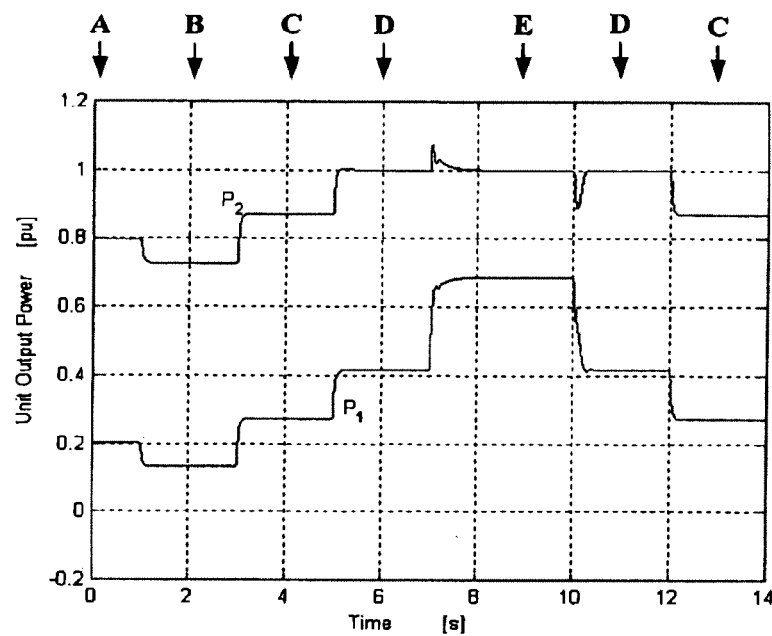
FIGS. 25($a$) and 25($b$) are graphs of predicted output power and instantaneous frequency, respectively, from the microsources in the system of FIG. 21, obtained using a computer simulation of unit power control during a transfer to island mode with a first series of loads added and removed.
Figure 25B:
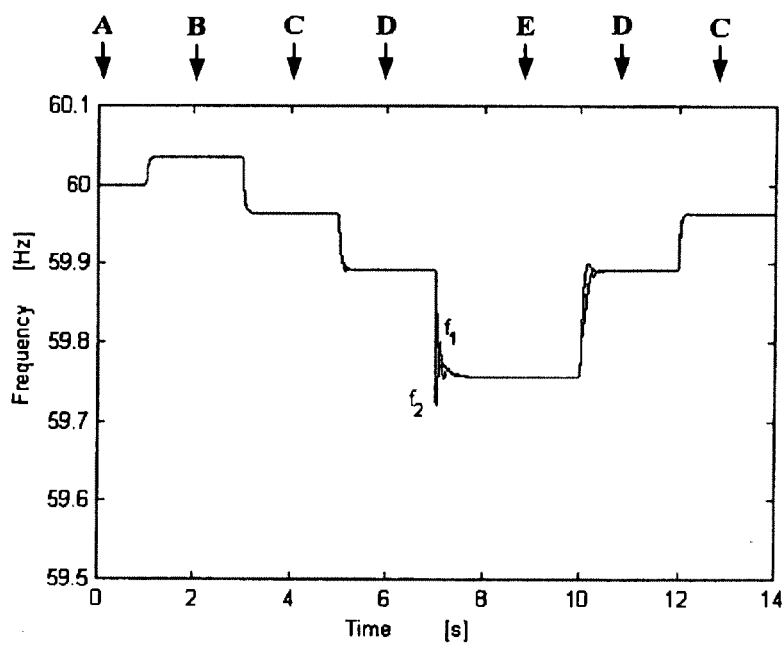

FIGS. 25(a) and 25(b) are graphs of predicted output power and instantaneous frequency, respectively, from the microsources in the exemplary system of FIG. 21, from a computer simulation of unit power control of the system of FIG. 21 during the following sequence of events:

| | | |
|---|---|---|
| t = 0 sec | steady state, grid connected | operating at steady state A |
| t = 1 sec | transfer to island | transition to steady state B |
| t = 3 sec | first load inserted | transition to steady state C |
| t = 5 sec | second load inserted | transition to steady state D |
| t = 7 sec | third load inserted | transition to steady state E |
| t = 10 sec | third load removed | transition to steady state D |
| t = 12 sec | second load removed | transition to steady state C |

FIG. 25(a) shows the output power from both units. In FIG. 25(a), in this case power is normalized and displayed "per unit" or "pu", mapping the operating range [0, $P_{max}$] to the interval of [0, 1.0]. Power never exceeds the maximum value of 1.0 per unit in steady state. All the steady states have been labeled with capital letters corresponding to the steady states listed above.

FIG. 25(b) shows the instantaneous frequency at both units as the system is subject to the same events. The value of $\Delta\omega$, needed to calculate the value of the slope, has been chosen to correspond to a maximum frequency deviation of 0.5 Hz, but this particular value is chosen for illustration and not as a limitation. Other maximum frequency deviations greater than or less than 0.5 Hz could be used.

The simulation of FIGS. 25(a)-(b) shows a unit reaching maximum output as a consequence of load increasing. If the load was actually decreased, then it follows that one of the two units will reach zero power output limit.

Figure 26A:
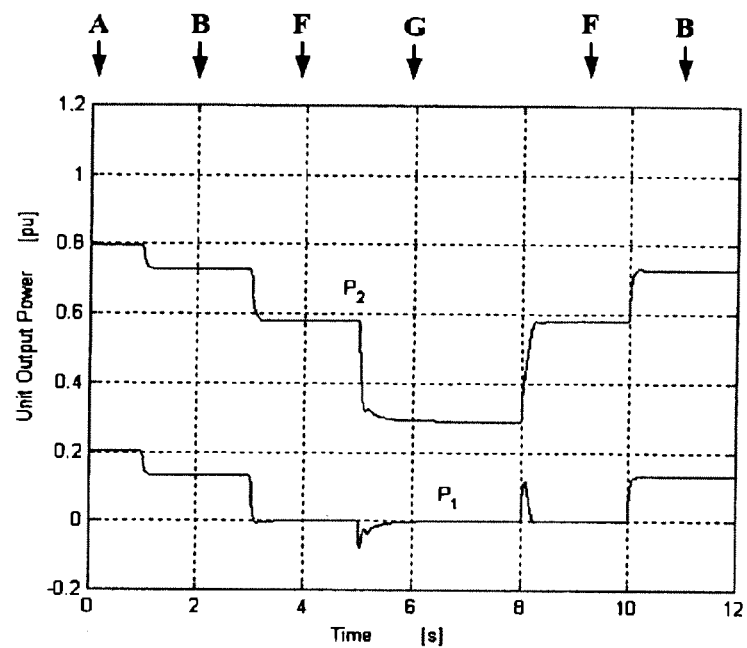
FIGS. 26($a$) and 26($b$) are graphs of predicted output power and instantaneous frequency, respectively, from the microsources in the exemplary system of FIG. 21, obtained using a computer simulation of unit power control during a transfer to island mode with a second series of loads added and removed.
Figure 26B:
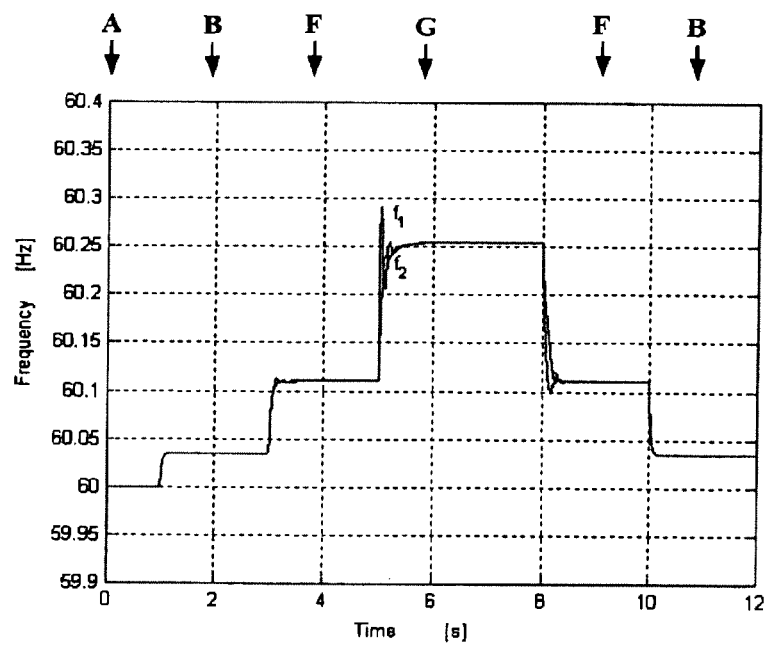

FIGS. 26(a) and 26(b) are graphs of predicted output power and instantaneous frequency, respectively, from the microsources in the exemplary system of FIG. 21, from a computer simulation of unit power control of the system of FIG. 21 during a different sequence of events:

| | | |
|---|---|---|
| t = 0 sec | steady state, grid connected | operating at steady state A |
| t = 1 sec | transfer to island | transition to steady state B |
| t = 3 sec | first load removed | transition to steady state F |
| t = 5 sec | second load removed | transition to steady state G |
| t = 8 sec | second load inserted | transition to steady state F |
| t = 10 sec | first load inserted | transition to steady state B |

FIG. 26(*a*) shows the output power from both units during the sequence of events above. All the steady states have been labeled with capital letters corresponding to the steady states listed above. FIG. 26(*b*) shows the instantaneous frequency at both units as the system is subject to the same events. Active power injection never falls below the value of $P_{min}$=0 pu in steady state. On FIGS. 26(*a*)-(*b*), steady states A and B are the same as in FIGS. 25(*a*)-(*b*).

Figure 27:
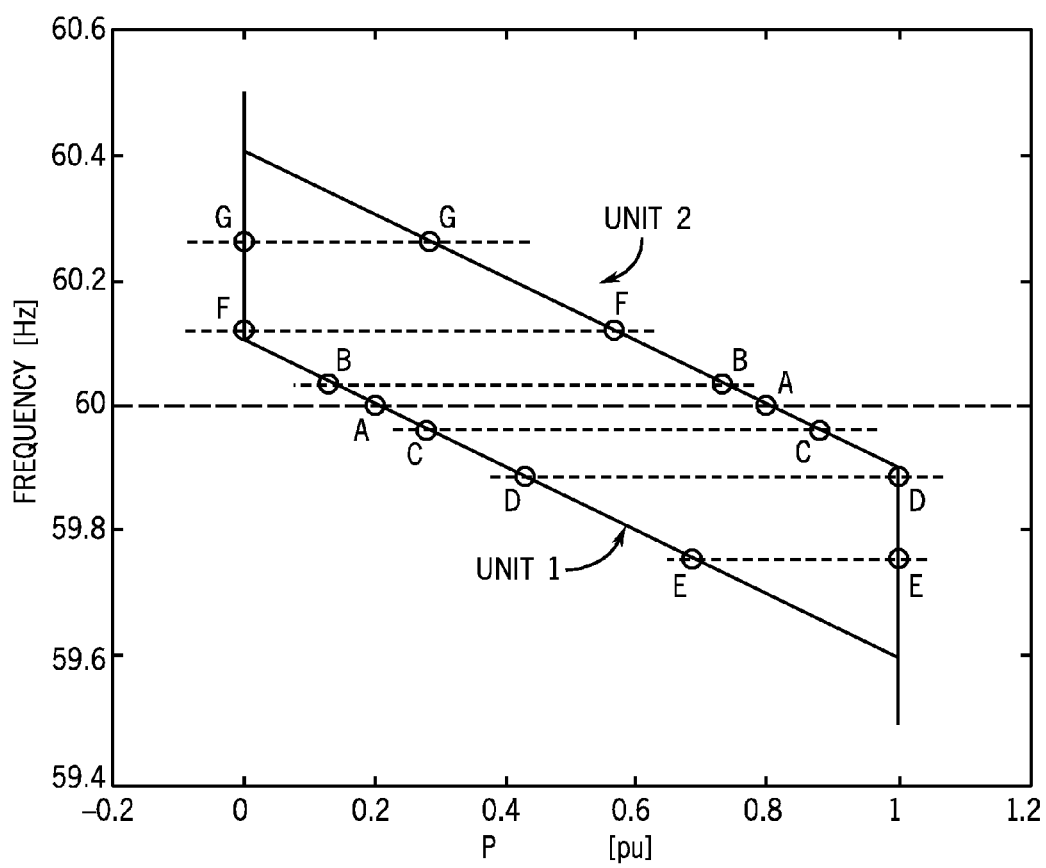
FIG. 27 is a graph depicting the relationship between steady state unit power vs. frequency (P-ω) in a unit power control scheme according to the invention applied to the system of FIG. 21, showing the steady state operation points (A)-(G) of FIGS. 25-26.

FIG. 27 is a graph depicting the relationship between steady state unit power vs. frequency (P-ω) in a method of unit power control of the system of FIG. 21, showing the steady state operation points (A)-(G) of FIGS. 25-26 for both units. FIG. 27 shows that the operating points (A)-(G) fall on the steady state characteristics of a unit control scheme such as that of FIG. 17.

Figure 28A:
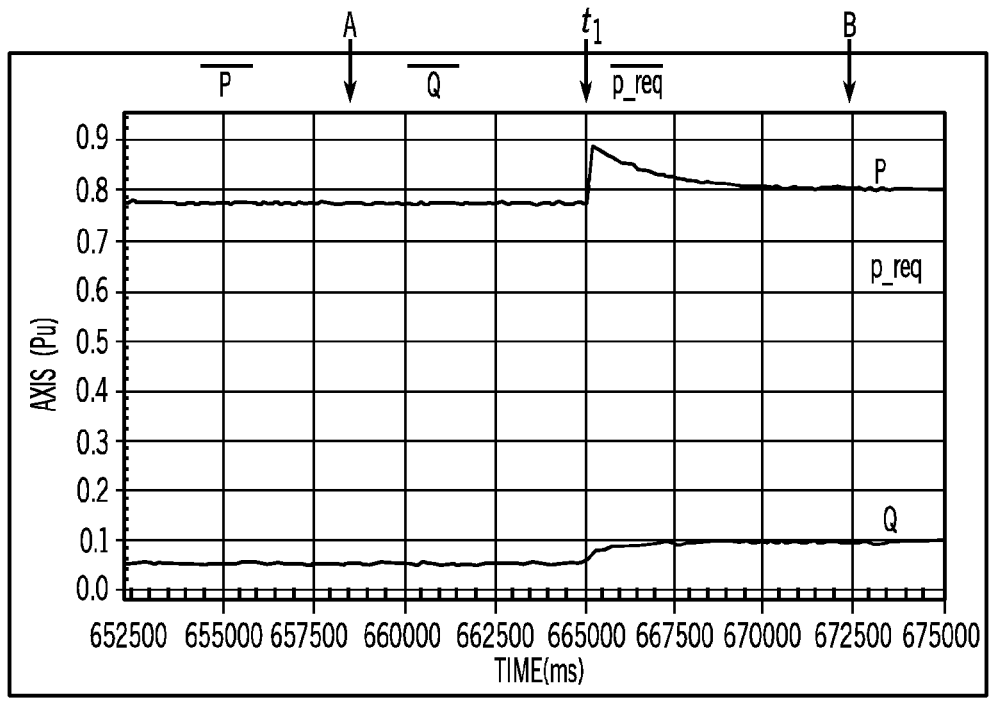
FIGS. 28($a$) and 28($b$) are graphs of predicted real power (P) and reactive power (Q) from the microsources 2102 and 2105, respectively, in the exemplary system of FIG. 21, obtained using a hardware simulation of unit power control with a load added when the system is in steady state island mode.
Figure 28B:
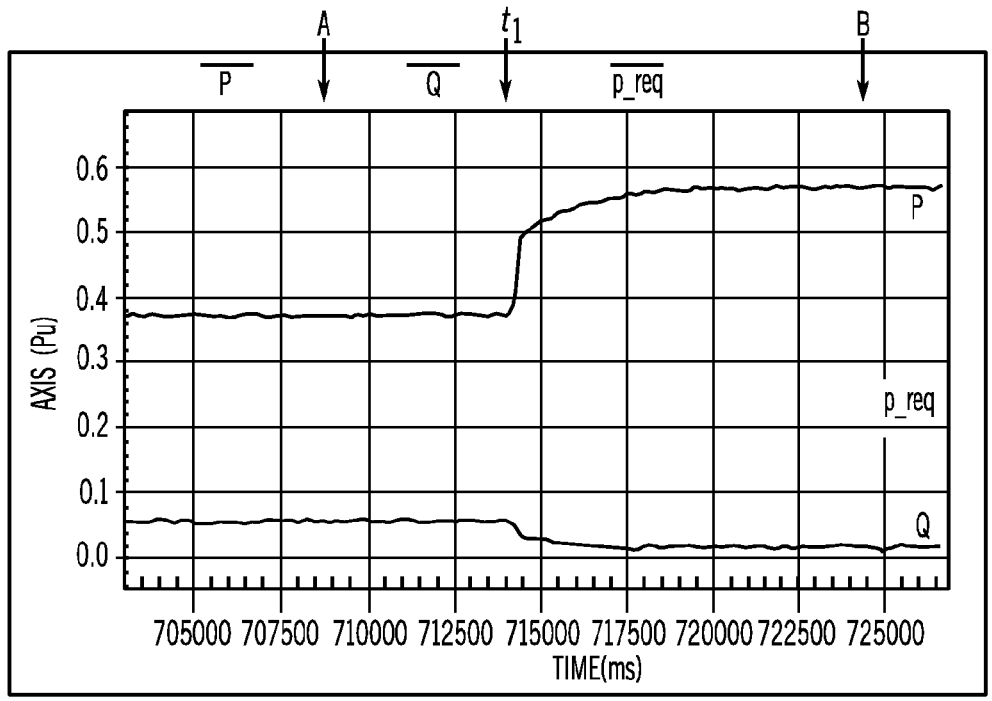

FIGS. 28(*a*) and 28(*b*) are graphs of predicted real power (P) and reactive power (Q) from the microsources of unit 1 and unit 2, respectively, in the exemplary system of FIG. 21, from a hardware simulation of unit power control of the system of FIG. 21 when a new load is inserted during the following sequence of events:

| | | |
|---|---|---|
| t = 0 sec | steady state, island mode | operating at steady state A |
| t = t₁ sec | load is inserted | transition to steady state B |

The results of the hardware simulation of the system of FIG. 21 are very similar to the results of the computer simulation of that system. The loading event at t=$t_1$ sec is designed so that the load insertion leads unit 1 to reach its maximum power output.

Notice that the power scaling is such that the interval [0, $P_{max}$] is projected on a corresponding interval of [0, 0.8]. The value 0.8 pu represents maximum power. This is because of the issues of representing quantities in hardware. Namely, the Digital Signal Processor used was only able to represent numbers between −1 and +1. If 1.0 was used to represent maximum power, it would not be possible to represent any overshoot. With Pmax being 0.8, then small overshoots larger than Pmax can be internally represented.

Figure 29A:
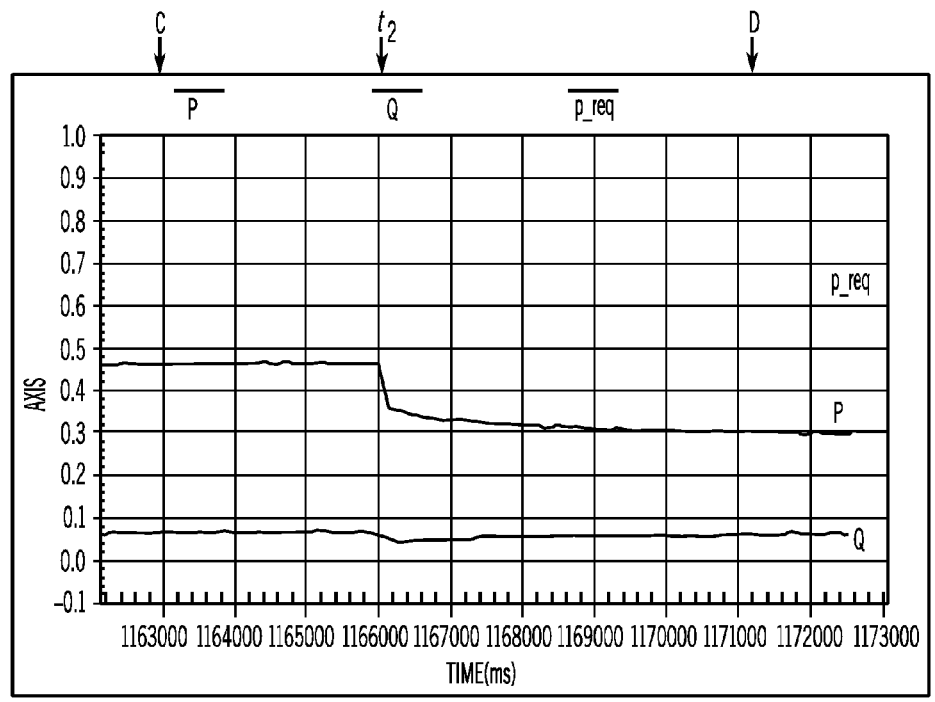
FIGS. 29($a$) and 29($b$) are graphs of predicted real power (P) and reactive power (Q) from the microsources unit 1 and unit 2, respectively, in the exemplary system of FIG. 21, obtained using a hardware simulation of unit power control with a load removed when the system is in steady state island mode.
Figure 29B:
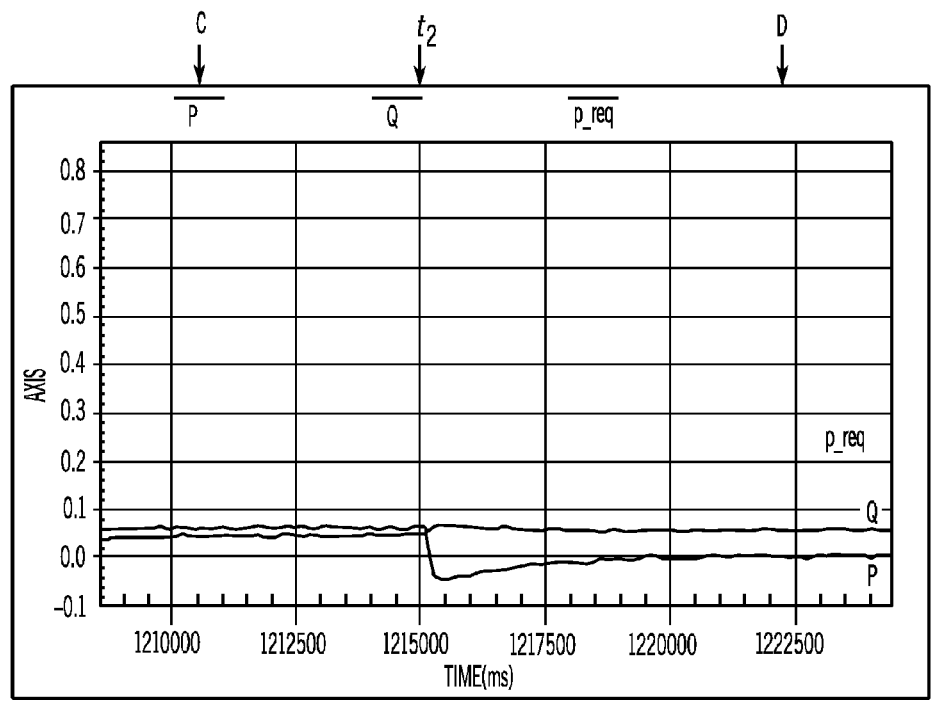

FIGS. 29(*a*) and 29(*b*) are graphs of predicted real power (P) and reactive power (Q) from the microsources of unit 1 and unit 2, respectively, in the exemplary system of FIG. 21, from a hardware simulation of unit power control of the system of FIG. 21 when a load is removed during the following sequence of events:

| | | |
|---|---|---|
| t = 0 sec | steady state, island mode | operating at steady state C |
| t = t₂ | load is removed | transition to steady state D |

The load removal event at t=$t_2$ sec is designed so that the load insertion leads unit 2 to reach its minimum power output, P=0. Notice that the initial steady state points A and C are not identical. The power setpoints are the same, but the loading level is different: higher in A (so that a load insertion allows to reach Pmax), lower in C (so that a load removal allows to reach P=0). Although there is no available frequency waveform, these hardware results show that the power in steady state is constrained to the interval [0, $P_{max}$] (i.e. [0, 0.8]) exactly as shown in FIG. 17.

Figure 30:
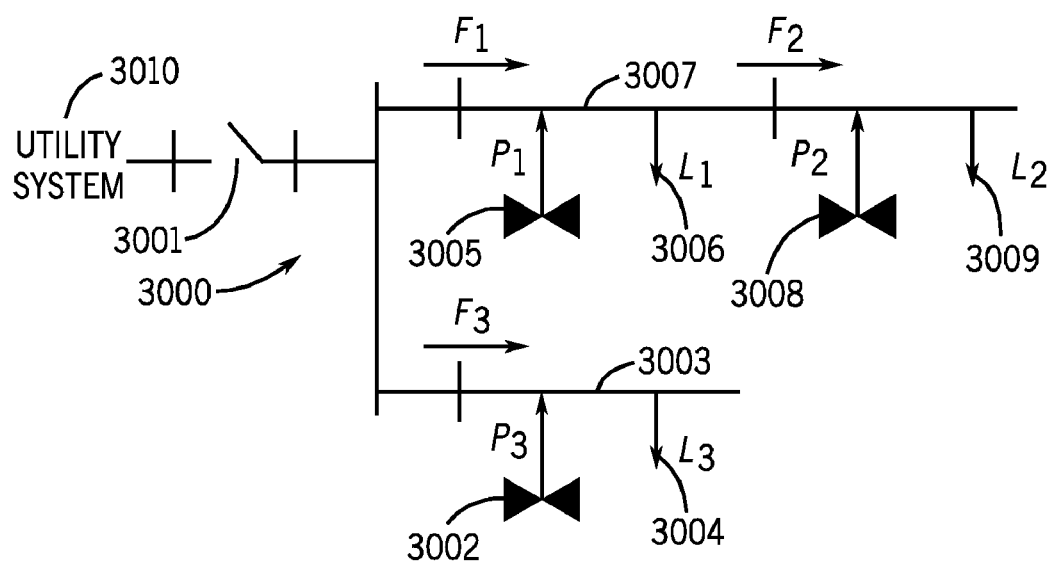
FIG. 30 is an exemplary system having two zones, an upper zone with two microsource units, and a lower zone with one microsource unit.
Figure 31A:
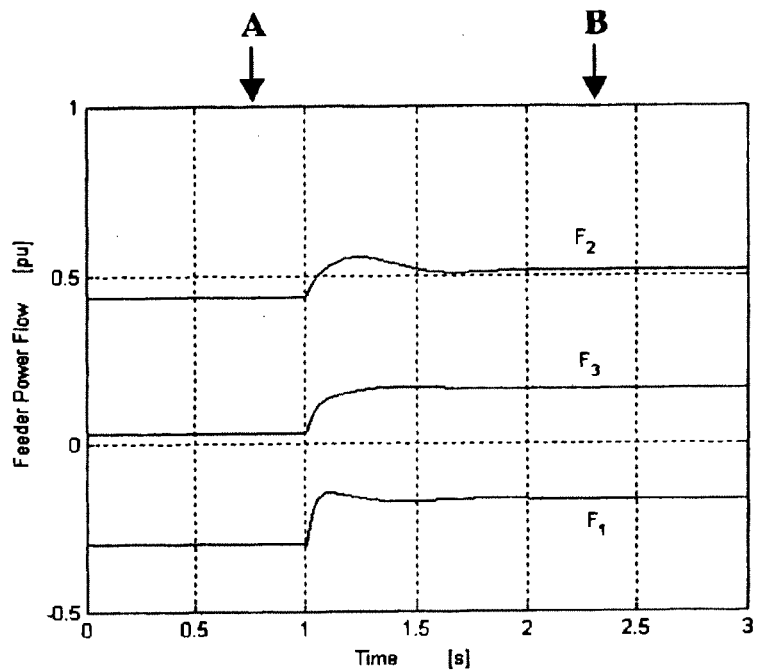
FIGS. 31($a$) and 31($b$) are graphs of predicted zone power flow and instantaneous frequency, respectively, from the microsources in the exemplary system of FIG. 30, obtained using a computer simulation of zone power control during a transfer to island mode.
Figure 31B:
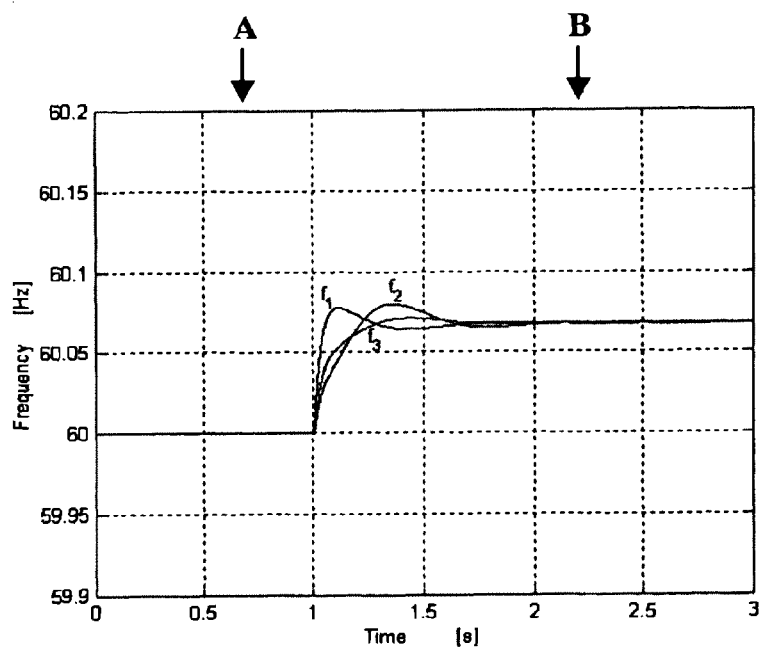
Figure 32A:
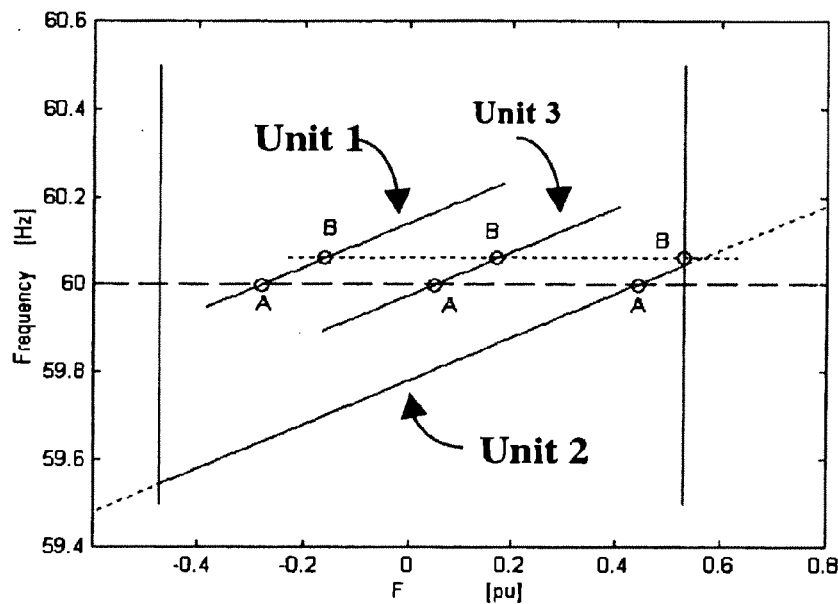
FIG. 32($a$) is a graph depicting the relationship between steady state frequency vs. zone power flow in a zone power control scheme according to the invention applied to the system of FIG. 30, showing the steady state operation points (A)-(B) of FIGS. 31($a$)-31($b$), and FIG. 32($b$) is a magnification of the relationship of FIG. 32($a$) for unit 2.
Figure 32B:
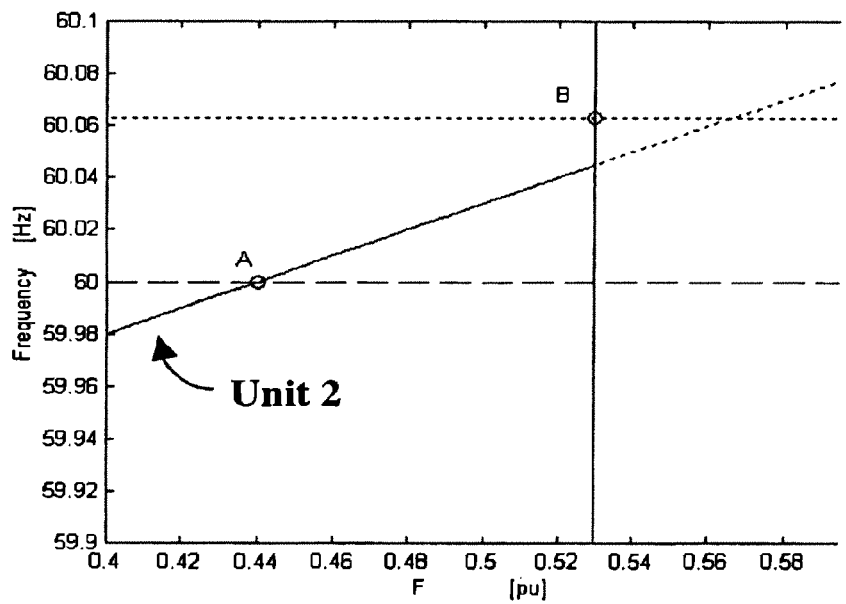
Figure 33:
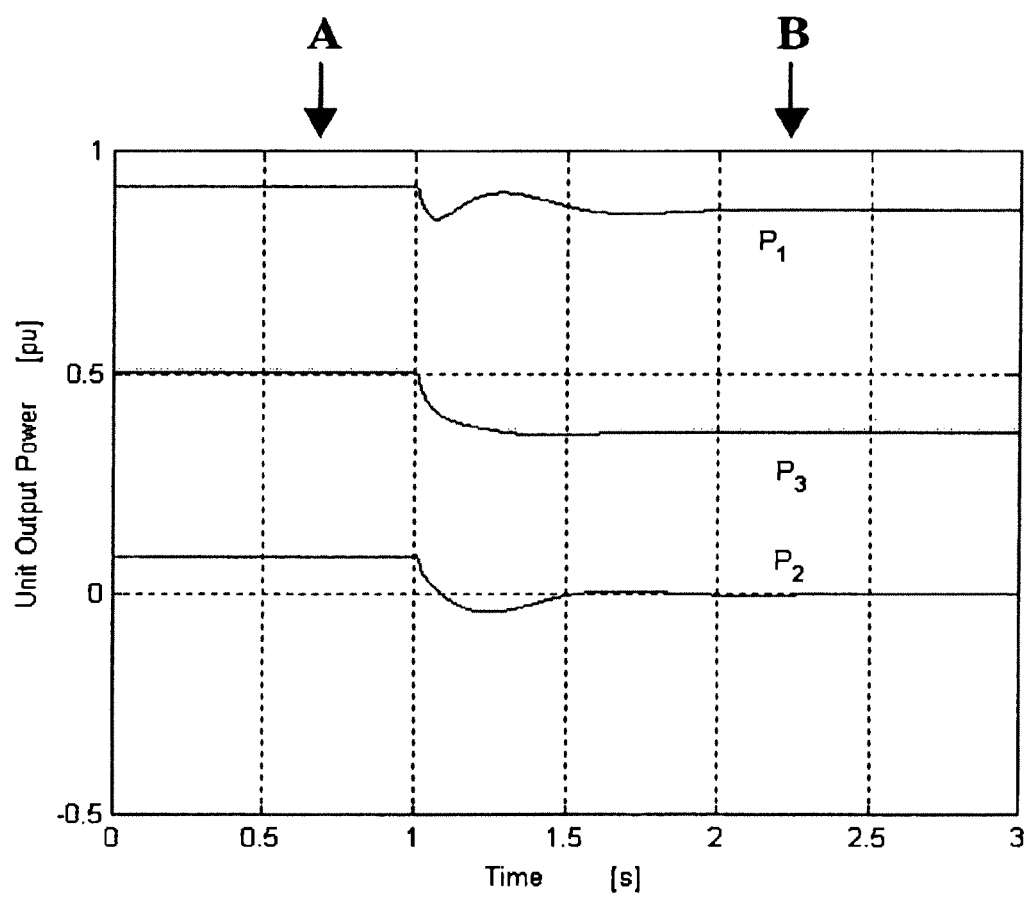
FIG. 33 is a graph of the predicted unit real power flow from the microsources in the exemplary system of FIG. 30, obtained using a computer simulation of zone power control during a transfer to island mode.

FIGS. 31-33 depict computer simulations of zone power control of the exemplary system of FIG. 30 having two zones, an upper zone with two microsource units, and a lower zone with one microsource unit. The two-zone microgrid 3000 of FIG. 30 has a first zone with a microsource 3002 and a load 3004 on a first local power bus 3003 and a second zone with microsources 3005 and 3008 and loads 3006 and 3009 on a second local power bus 3007, with the microgrid 3000 connected by an interface switch 3001 to a utility system 3010.

These simulations show the behavior of the system of FIG. 30 when operated using the zone control approach shown in FIG. 20 and subjected to load changes that cause the microsources to reach their limits when all the units are controlling the zone power flow. No hardware results are shown for this control configuration.

The earlier description above showed that there are several events that could lead to units reaching their limits. On the F-ω plane the limits were shown as a sliding window. The window slides as loads change: in this simulation no load will be changed to ensure that the window will stay motionless. This is to ease the inspection of the plots, but does not limit the scope of the results.

FIGS. 31(*a*) and 31(*b*) are graphs of predicted zone power flow and instantaneous frequency, respectively, from the microsources in the exemplary system of FIG. 30, obtained using a computer simulation of zone power control during a sudden transfer to island mode from a steady state connected to the grid. This transfer to island triggers one of the units to reach one of its limits.

| | | |
|---|---|---|
| t = 0 sec | steady state, grid connected | operating at steady state A |
| t = 1 | transfer to island | transition to steady state B |

FIG. 31(*a*) shows the flow in each of the controlled zones following the islanding. During grid connection the setpoints $F_{o1}$ through $F_{o3}$ are tracked. When grid disconnects, the sum of the flows that converge to the grid must be zero. From FIG. 24, this implies F1=−F3, which is the condition established during island mode. FIG. 31(*b*) shows that the frequency is increased from the nominal system value to a higher value when the system islands.

FIG. 32(*a*) is a graph depicting the relationship between steady state frequency vs. zone power flow in a method of zone power control of the system of FIG. 30, showing the steady state operation points (A)-(B) of FIGS. 31(*a*)-31(*b*). FIG. 32(*b*) is a magnification of FIG. 32(*a*) from operating point (A) to operating point (B) for unit 2.

Unit 2 reaches minimum power and is constrained on the vertical portion of the steady state characteristic, as shown magnified in FIG. 32(*b*). Notice that since units 1 and 3 are operating within their limits, then their steady state points will belong to the slanted part of the steady state characteristic, as expected. To avoid confusion, only the operating window of unit 2 is shown. Since the steady state point B lays on the vertical band delimiting the right side of the window, then it must be that a minimum power limit is reached.

FIG. 33 is a graph of the predicted unit real power flow from the microsources in the exemplary system of FIG. 30, obtained using a computer simulation of zone power control during a transfer to island mode. FIG. 33 shows that unit 2 reaches a P=0 limit, as expected.

FIGS. 34-36 depict computer simulations of a mix of unit and zone power control of the exemplary system of FIG. 30 having two zones, an upper zone with two microsource units, and a lower zone with one microsource unit. In a mix of zone and unit power control, in which some of the units control unit output power while others control zone power flow:

| Unit 1 | Zone Flow Control | zone flow setpoint $F_{o1}$ |
| Unit 2 | Unit Output Control | unit power setpoint $P_{o2}$ |
| Unit 3 | Zone Flow Control | zone flow setpoint $F_{o3}$ |

For the units controlling zone power flow, the limits are shown on the F-ω plane as a sliding window. The window slides when loads change: no load will be changed to ensure that for this experiment the window will stay motionless. This is to ease the inspection of the plots, but does not limit the scope of the results.

These computer simulations show the behavior of the system of FIG. 30 when operated using the above-described mix of zone and unit power control, when the system is subjected to the following events:

| t = 0 sec | steady state, grid connected | operating at steady state A |
| t = 1 | Transfer to island | transition to steady state B |

Figure 34A:
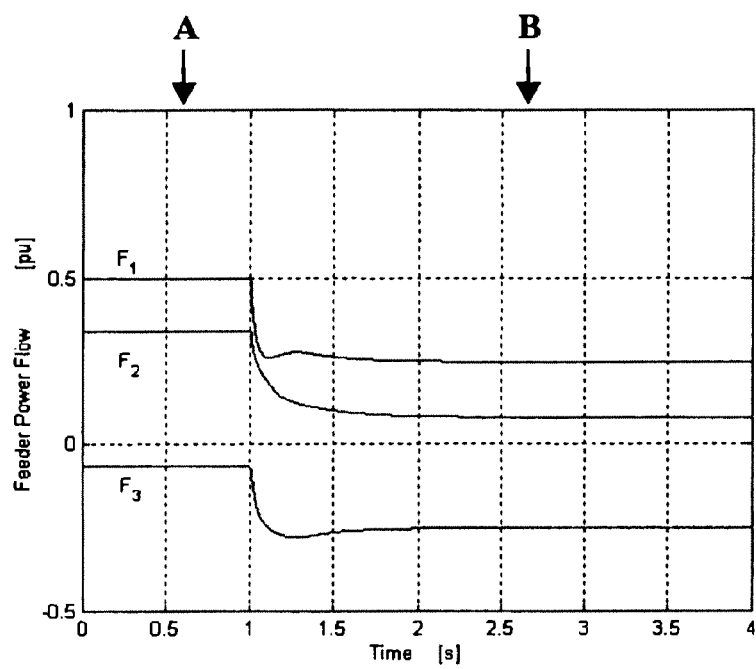
FIGS. 34($a$) and 34($b$) are graphs of predicted zone power flow and instantaneous frequency, respectively, from the microsources in the exemplary system of FIG. 30, obtained using a computer simulation of a mix of zone and unit power control during a transfer to island mode.
Figure 34B:
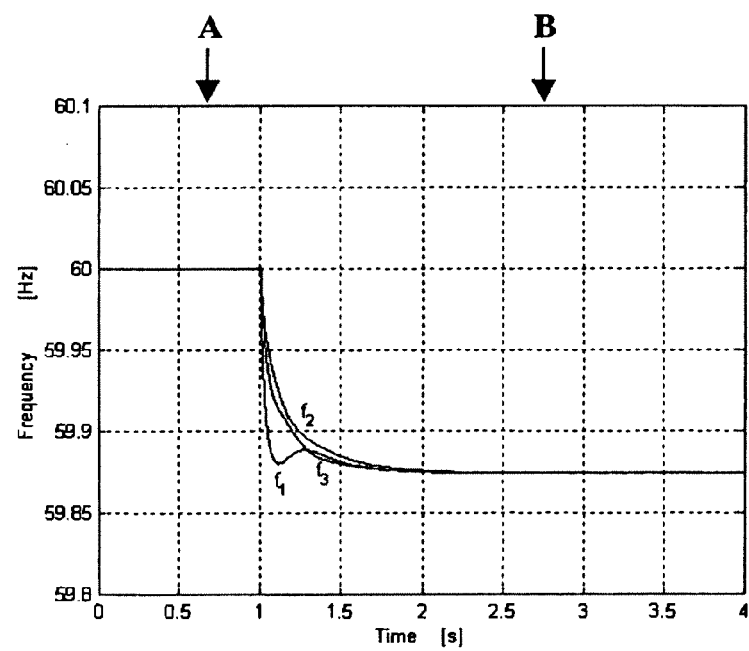

FIGS. 34(a) and 34(b) are graphs of predicted zone power flow and instantaneous frequency, respectively. FIG. 34(a) shows the zone flows as the system transfers to island. The setpoints for units 1 and 3 are tracked during grid connection. The flows F1 and F3 are constrained by the steady state characteristic, while the flow F2 is just a measure and is not subject to any constraint. Because the sum of the flows to the grid must equal zero in island, then from FIG. 24, it follows that F1=−F3, which can be visually verified in FIG. 34(a). FIG. 34(b) shows the frequency during the same event: it has decreased from the nominal value.

FIG. 35 is a graph of the predicted unit real power flow from the microsources in the exemplary system of FIG. 30, obtained using a computer simulation of a mix of zone and unit power control during a transfer to island mode. Note that the setpoint output power for unit 2 is tracked during grid connection. During islanding the value of P2 is constrained by the steady state characteristic (FIG. 17), while P1 and P3 are just measures of the injections and are not constrained to a characteristic. FIG. 35 shows that the transfer to island causes unit 3 to reach maximum output power, while units 1 and 2 are within limits.

FIG. 36 is a graph depicting the relationship between steady state frequency vs. zone and unit power flow in a method of mixed zone and unit power control of the system of FIG. 30, showing the steady state operation points (A)-(B) of FIGS. 34(a)-34(b), and FIG. 35. Notice that this is a mixed (P-ω and F-ω) plane. Unit 3 reaches maximum and is constrained on the vertical portion of the steady state characteristic. Notice that since unit 1 is operating within its limits, then its steady state will belong to the slanted part of the steady state characteristic, as expected. Unit 2 (that regulates P) is also within limits and its steady state points lay inside its own operating window.

The fact that unit 3 reaches a maximum power limit explains why the steady state lays on the left side vertical portion of the characteristic. FIG. 36 shows only the limits relevant to unit 3 to avoid confusion when overlapping the limits of all three units.

It is important to note that the construction and arrangement of the steps in the methods, and the elements of the structures, shown in the exemplary embodiments discussed herein are illustrative only. Those skilled in the art who review this disclosure will readily appreciate that many modifications are possible (e.g., variations in sizes, dimensions, structures, shapes and proportions of the various elements, values of parameters, mounting arrangements, materials, transparency, color, orientation, etc.) without materially departing from the novel teachings and advantages of the invention.

The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the spirit of the present invention as expressed in the appended claims.

The components of the invention may be mounted to each other in a variety of ways as known to those skilled in the art. As used in this disclosure and in the claims, the terms mount and attach include embed, glue, join, unite, connect, associate, hang, hold, affix, fasten, bind, paste, secure, bolt, screw, rivet, solder, weld, and other like terms. The term cover includes envelop, overlay, and other like terms.

While the exemplary embodiments illustrated in the figures and described above are presently preferred, it should be understood that these embodiments are offered by way of example only. Other embodiments may include, for example, different techniques for power calculation, voltage control, power control, or droop control. The invention is not limited to a particular embodiment, but extends to various modifications, combinations, and permutations that nevertheless fall within the scope and spirit of the appended claims.

It is understood that the invention is not confined to the embodiments set forth herein as illustrative, but embraces all such forms thereof that come within the scope of the following claims.

What is claimed is:

1. A method of controlling distributed energy resources, the method comprising:
operating a microsource in a grid mode in which the microsource is connected to a utility grid, wherein the microsource is located in a microgrid and is configured to deliver a power $P_1$ at a frequency $\omega_1$, wherein during operation in the grid mode the frequency ω1 is approximately equal to a first frequency and the power $P_1$ is approximately equal to a first power, and wherein the first frequency is an operating frequency of the utility grid; and
transferring the microsource from the grid mode to an island mode such that the microsource is disconnected from the utility grid, wherein the transferring causes a frequency change such that the frequency $\omega_1$ changes to a second frequency and a power change such that the power $P_1$ changes to a second power;
wherein the microsource has a slope switch frequency, wherein the frequency change occurs at a first rate with respect to the power change while the frequency ω1 is less than the slope switch frequency, and wherein the frequency change occurs at a second rate with respect to the power change while the frequency $\omega_1$ is greater than the slope switch frequency.

2. The method of claim 1, wherein the second frequency is greater than the first frequency and the second power is less than the first power if the microgrid was exporting power prior to the transfer from the grid mode to the island mode.

3. The method of claim 1, wherein the second frequency is less than the first frequency and the second power is greater than the first power if the microgrid was importing power prior to the transfer from the grid mode to the island mode.

4. The method of claim 1, wherein the power change occurs at the first rate with respect to the frequency change while the frequency ω1 is less than the slope switch frequency, and wherein the power change occurs at the second rate with respect to the frequency change while the frequency $\omega_1$ is greater than the slope switch frequency.

5. The method of claim 4, wherein the power $P_1$ is greater than a hypothetical power while the frequency $\omega_1$ is greater than the slope switch frequency, wherein the hypothetical power corresponds to a power that would result if an entire power change between the first power and the second power occurred only at the first rate.

6. The method of claim 4, wherein the power $P_1$ is less than a hypothetical power while the frequency $\omega_1$ is less than the slope switch frequency, wherein the hypothetical power corresponds to a power that would result if an entire power change between the first power and the second power occurred only at the first rate.

7. The method of claim 1, wherein the slope switch frequency corresponds to a minimum power limit of the microsource.

8. The method of claim 1, wherein the slope switch frequency corresponds to a maximum frequency limit of the microsource.

9. The method of claim 1, further comprising:
operating a second microsource in the grid mode in which the second microsource is connected to the utility grid, wherein the second microsource is located in the microgrid and is configured to deliver a power $P_2$ at a frequency $\omega_2$, wherein during operation in the grid mode the frequency $\omega_2$ is approximately equal to the first frequency and the power $P_2$ is approximately equal to a third power; and
transferring the second microsource from the grid mode to the island mode such that the second microsource is disconnected from the utility grid, wherein the transferring the second microsource causes a second frequency change such that the frequency $\omega_2$ changes to a third frequency and a power change such that the power $P_2$ changes to a fourth power.

10. The method of claim 9, wherein the third frequency is greater than the first frequency and the third power is less than the fourth power if the microgrid was exporting power prior to the transfer from the grid mode to the island mode, and wherein the third frequency is less than the first frequency and the third power is greater than the fourth power if the microgrid was importing power prior to the transfer from the grid mode to the island mode.

11. The method of claim 9, wherein a difference in power between the second power and the first power is approximately equal to a difference in power between the third power and the fourth power.

12. The method of claim 1, wherein the frequency $\omega_1$ is less than a hypothetical frequency while the frequency $\omega_1$ is greater than the slope switch frequency, wherein the hypothetical frequency corresponds to a frequency that would result if an entire frequency change between the first frequency and the second frequency occurred only at the first rate.

13. The method of claim 1, wherein the frequency $\omega_1$ is greater than a hypothetical frequency while the frequency $\omega_1$ is less than the slope switch frequency, wherein the hypothetical frequency corresponds to a frequency that would result if an entire frequency change between the first frequency and the second frequency occurred only at the first rate.

14. A microgrid comprising:
a microsource including a power controller configured to
control a frequency $\omega_1$ and a power $P_1$ of the microsource;
operate the microsource in a grid mode in which the microsource is connected to a utility grid, and wherein the frequency $\omega_1$ is approximately equal to a first frequency and the power $P_1$ is approximately equal to a first power, wherein the first frequency is an operating frequency of the utility grid; and
transfer the microsource from the grid mode to an island mode such that the microsource is disconnected from the utility grid, wherein the transfer causes a frequency change such that the frequency $\omega_1$ changes to a second frequency and a power change such that the power $P_1$ changes to a second power;
wherein the microsource has a slope switch frequency, wherein the frequency change occurs at a first rate with respect to the power change while the frequency ω1 is less than the slope switch frequency, and wherein the frequency change occurs at a second rate with respect to the power change while the frequency ω1 is greater than the slope switch frequency.

15. The microgrid of claim 14, wherein the second frequency is greater than the first frequency and the second power is less than the first power if the microgrid was exporting power prior to the transfer from the grid mode to the island mode, and wherein the second frequency is less than the first frequency and the second power is greater than the first power if the microgrid was importing power prior to the transfer from the grid mode to the island mode.

16. The microgrid of claim 14, wherein the power change occurs at the first rate with respect to the frequency change while the frequency $\omega_1$ is less than the slope switch frequency, and wherein the power change occurs at the second rate with respect to the frequency change while the frequency $\omega_1$ is greater than the slope switch frequency.

17. The microgrid of claim 14, wherein the power $P_1$ is greater than a hypothetical power while the frequency $\omega_1$ is greater than the slope switch frequency, wherein the hypothetical power corresponds to a power that would result if an entire power change between the first power and the second power occurred only at the first rate, and wherein the power $P_1$ is less than the hypothetical power while the frequency $\omega_1$ is less than the slope switch frequency.

18. The microgrid of claim 14, further comprising:
a second microsource including a second power controller configured to:
operate the second microsource in the grid mode in which the second microsource is connected to the utility grid, wherein the second microsource is located in the microgrid and is configured to deliver a power $P_2$ at a frequency $\omega_2$, wherein during operation in the grid mode the frequency $\omega_2$ is approximately equal to the first frequency and the power $P_2$ is approximately equal to a third power; and
transfer the second microsource from the grid mode to the island mode such that the second microsource is disconnected from the utility grid, wherein the transferring the second microsource causes a second frequency change wherein the frequency $\omega_2$ changes to a third frequency and a power change wherein the power $P_2$ changes to a fourth power.

19. The microgrid of claim 14, wherein the frequency $\omega_1$ is less than a hypothetical frequency while the frequency $\omega_1$ is greater than the slope switch frequency, wherein the hypothetical frequency corresponds to a frequency that would result if an entire frequency change between the first frequency and the second frequency occurred only at the first rate.

20. The microgrid of claim 14, wherein the frequency $\omega_1$ is greater than a hypothetical frequency while the frequency $\omega_1$ is less than the slope switch frequency, wherein the hypothetical frequency corresponds to a frequency that would result if an entire frequency change between the first frequency and the second frequency occurred only at the first rate.

* * * * *